United States Patent
Naito

(10) Patent No.: US 9,184,852 B2
(45) Date of Patent: Nov. 10, 2015

(54) RECEIVING DEVICE AND RECEIVING METHOD

(71) Applicant: FUJITSU LIMITED, Kawasaki-shi, Kanagawa (JP)

(72) Inventor: Mayumi Naito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 13/922,575

(22) Filed: Jun. 20, 2013

(65) Prior Publication Data

US 2014/0064724 A1   Mar. 6, 2014

(30) Foreign Application Priority Data

Aug. 31, 2012 (JP) .................. 2012-192545

(51) Int. Cl.
| H04B 10/00 | (2013.01) |
| H04B 10/60 | (2013.01) |
| H04B 10/079 | (2013.01) |
| H04B 10/67 | (2013.01) |

(52) U.S. Cl.
CPC .......... *H04B 10/60* (2013.01); *H04B 10/07955* (2013.01); *H04B 10/672* (2013.01)

(58) Field of Classification Search
USPC .................................. 398/161, 173–181
See application file for complete search history.

(56) References Cited

U.S. PATENT DOCUMENTS

| 5,335,109 A * | 8/1994 | Heidemann ............... 359/341.41 |
| 5,517,351 A * | 5/1996 | Hatakeyama ............ 359/341.41 |
| 5,633,749 A * | 5/1997 | Shibuya .................... 359/341.43 |
| 5,701,195 A * | 12/1997 | Chikama .................. 359/341.43 |
| 5,822,112 A * | 10/1998 | Itou et al. ................. 359/341.42 |
| 6,057,951 A * | 5/2000 | Sugawara ..................... 398/209 |
| 6,219,177 B1 * | 4/2001 | Tamura ....................... 359/341.1 |
| 6,335,823 B2 * | 1/2002 | Ohshima et al. ......... 359/341.32 |
| 6,366,393 B1 * | 4/2002 | Feulner et al. ................ 359/337 |
| 6,373,610 B1 * | 4/2002 | Takehana et al. ............. 398/158 |
| 6,373,625 B1 * | 4/2002 | Kobayashi et al. ...... 359/341.41 |
| 6,407,854 B1 * | 6/2002 | Shum ....................... 359/341.41 |
| 6,441,955 B1 * | 8/2002 | Takatsu et al. ............. 359/341.4 |
| 6,490,080 B2 * | 12/2002 | Cornelius et al. ........ 359/341.41 |
| 6,510,000 B1 * | 1/2003 | Onaka et al. .................. 359/334 |
| 6,522,461 B1 * | 2/2003 | Cornelius et al. ........ 359/341.44 |
| 6,636,659 B2 * | 10/2003 | Kagi et al. ....................... 385/24 |
| 6,687,049 B1 * | 2/2004 | Sulhoff et al. ............. 359/341.4 |
| 6,760,150 B2 * | 7/2004 | Goto et al. ................. 359/337.12 |
| 7,394,995 B2 * | 7/2008 | Audic et al. .................... 398/202 |
| 7,554,721 B2 * | 6/2009 | Hiraizumi et al. ............ 359/344 |
| 2002/0044324 A1* | 4/2002 | Hoshida et al. ............... 359/179 |
| 2003/0035164 A1* | 2/2003 | Labrunie et al. .............. 359/110 |

(Continued)

FOREIGN PATENT DOCUMENTS

JP   2010-122548   6/2010

*Primary Examiner* — Agustin Bello
(74) *Attorney, Agent, or Firm* — Staas & Halsey LLP

(57) ABSTRACT

A receiving device includes: an amplification fiber configured to include properties to amplify signal light when pumping light is supplied to the amplification fiber and to attenuate the signal light when the pumping light is stopped supplying to the amplification fiber; a receiver configured to receive the signal light output from the amplification fiber; a pumping light source configured to supply the pumping light to the amplification fiber; and a controller configured to control supplying and stopping of the pumping light from the pumping light source to the amplification fiber, so that a level of the signal light input to the receiver is contained within a dynamic range of the receiver.

13 Claims, 22 Drawing Sheets

(56) References Cited

U.S. PATENT DOCUMENTS

| | | | |
|---|---|---|---|
| 2005/0213968 A1* | 9/2005 | Uda et al. | 398/30 |
| 2005/0225843 A1* | 10/2005 | Sugaya et al. | 359/337.1 |
| 2005/0286898 A1* | 12/2005 | Okuno | 398/92 |
| 2007/0098411 A1* | 5/2007 | Ghera et al. | 398/177 |
| 2008/0158658 A1* | 7/2008 | Sugaya | 359/334 |
| 2008/0253763 A1* | 10/2008 | Uda et al. | 398/34 |
| 2010/0129081 A1* | 5/2010 | Onaka | 398/81 |
| 2011/0058821 A1* | 3/2011 | Goto | 398/195 |
| 2013/0004181 A1* | 1/2013 | Juarez et al. | 398/118 |
| 2014/0064724 A1* | 3/2014 | Naito | 398/25 |

* cited by examiner

RECEIVING DEVICE AND RECEIVING METHOD

CROSS-REFERENCE TO RELATED APPLICATION

This application is based upon and claims the benefit of priority of the prior Japanese Patent Application No. 2012-192545, filed on Aug. 31, 2012, the entire contents of which are incorporated herein by reference.

FIELD

The embodiments discussed herein are related to a receiving device and receiving method.

BACKGROUND

There has been a doped fiber amplifier as a type of optical amplifier. Upon inputting pumping light into a doped fiber amplifier, signal light which propagates through the doped fiber amplifier is amplified. Also, a distribution Raman amplifier is another optical amplifier. A distribution Raman amplifier that controls the driving state of a Raman pumping light source, based on monitor values of an optical signal-to-noise ratio (OSNR) for wavelength division multiplexing (WDM) light channels. For example, see Japanese Laid-open Patent Publication No. 2010-122548.

SUMMARY

According to an aspect of the invention, a receiving device includes: an amplification fiber configured to include properties to amplify signal light when pumping light is supplied to the amplification fiber and to attenuate the signal light when the pumping light is stopped supplying to the amplification fiber; a receiver configured to receive the signal light output from the amplification fiber; a pumping light source configured to supply the pumping light to the amplification fiber; and a controller configured to control supplying and stopping of the pumping light from the pumping light source to the amplification fiber, so that a level of the signal light input to the receiver is contained within a dynamic range of the receiver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
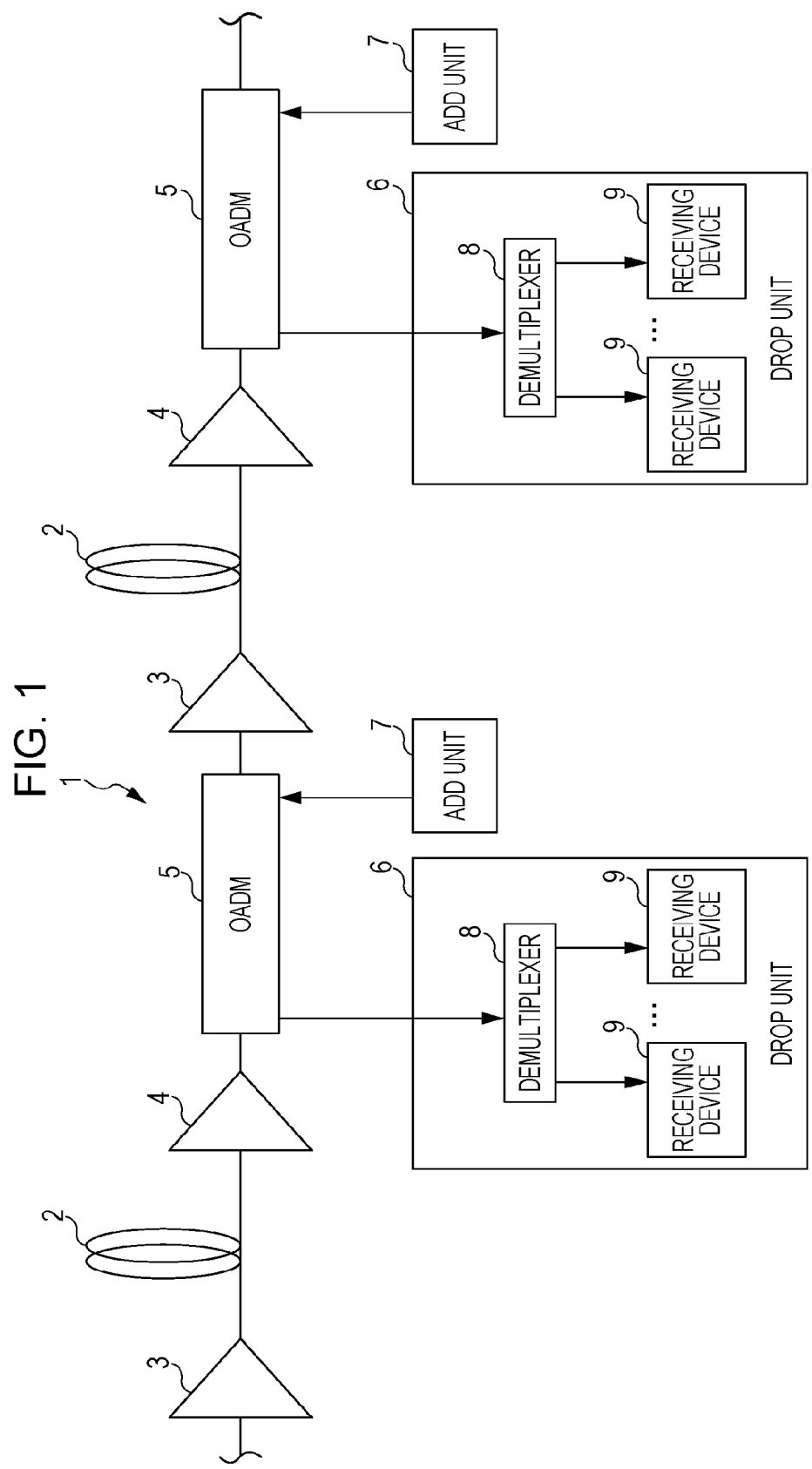
FIG. 1 is a diagram illustrating an example of a light communication system according to an embodiment.

In a receiving device having a receiver that receives signal light, there may be cases wherein the minimum receiving level that the receiving device requests is lower than the minimum receiving level guaranteed by the receiver. In such a case, a one-wave amplifying light amplifier may be disposed in front of a receiver, for example, and amplify the signal light, and the input level to the receiver may be contained within the dynamic range of the receiver. For example, an erbium doped fiber amplifier (EDFA) may be used as a one-wave amplifying light amplifier.

In order to amplify a signal light with an optical amplifier in a stable manner, gain has to be obtained even if the input level to the receiving device is high. Therefore, in the case that the input level to the receiving device is high, the input level to the receiver may be so amplified as to exceed the maximum input level of the receiver. As a solution thereto, an optical attenuator may be disposed behind the optical amplifier, whereby the signal light after amplification by the optical amplifier is attenuated by the optical attenuator, then input into the receiver.

However, if the signal light is temporarily amplified by the optical amplifier and then attenuated by an optical attenuator, energy efficiency is poor. Thus, a problem of high power consumption occurs. In order to improve energy efficiency and reduce power consumption, it is desirable to attenuate the signal light after amplification and not provide an optical attenuator.

Preferred embodiments of technology relating to a receiving device and receiving method which may suppress power consumption in the case of receiving signal light after amplification by an optical amplifier will be described with reference to the appended diagrams.

Hereinafter, in descriptions of the embodiment, similar configuration elements are denoted by the same reference numerals, and redundant description will be omitted.

FIG. 1 is a diagram illustrating an example of an optical communication system according to an embodiment. In the optical communication system 1 illustrated in FIG. 1, a wavelength division multiplexing transmission system is used where signal light of multiple different wavelengths are multiplexed and propagated on an optical transmission line. As illustrated in FIG. 1, the optical communication system 1 may have an optical transmission line 2, WDM optical transmission amplifier 3, WDM optical receiving amplifier 4, optical add-drop multiplexer (OADM) 5, drop unit 6, and add unit 7, for example.

The optical transmission line 2 is a propagations path for signal light. Examples of the optical transmission line 2 include an optical fiber and optical waveguide.

The WDM optical transmission amplifier 3 is connected to the optical transmission line 2, for example. The WDM optical transmission amplifier 3 amplifies WDM light that is output from the OADM 5 and propagated over the optical transmission line 2. An example of the WDM optical transmission amplifier 3 may be an optical amplifier that has an erbium-doped optical fiber.

The WDM optical receiving amplifier 4 is connected to the optical transmission line 2, for example. The WDM optical receiving amplifier 4 amplifies WDM light that is propagated over the optical transmission line 2 and input into the OADM 5. An example of the WDM optical receiving amplifier 4 may be an optical amplifier that has an erbium-doped optical fiber.

The OADM 5 is disposed between the WDM optical receiving amplifier 4 and the WDM optical transmission amplifier 3. The OADM 5 selects a signal light of a desired wavelength from the WDM light input into the OADM 5, and transmits this to the drop unit 6. The OADM 5 inserts the signal light of various wavelengths transmitted from the add unit 7 into the WDM light, and transmits out to the optical transmission line 2.

The drop unit 6 is connected to the OADM 5. The drop unit 6 receives the signal light selected by the OADM 5, by wavelength. The drop unit 6 may also have a demultiplexer 8 and multiple receiving devices 9, for example.

The demultiplexer 8 is connected to the OADM 5. The demultiplexer 8 separates the signal light extracted from the OADM 5, by wavelength. The number of receiving devices 9 connected to the demultiplexer 8 is a number corresponding to the wavelength of the signal light separated by the demultiplexer 8, for example.

The receiving devices 9 receive signal light of corresponding wavelengths, of the multiple wavelength signal lights separated by the demultiplexer 8. The receiving devices 9 convert the signal light into electrical signals, and transmit to a processing unit at a later stage, of which the diagram is omitted. The receiving devices 9 will be described in detail later. The add unit 7 is connected to the OADM 5. The add unit 7 generates signal light of various wavelengths, and transmits this to the OADM 5.

First Embodiment

Figure 2:
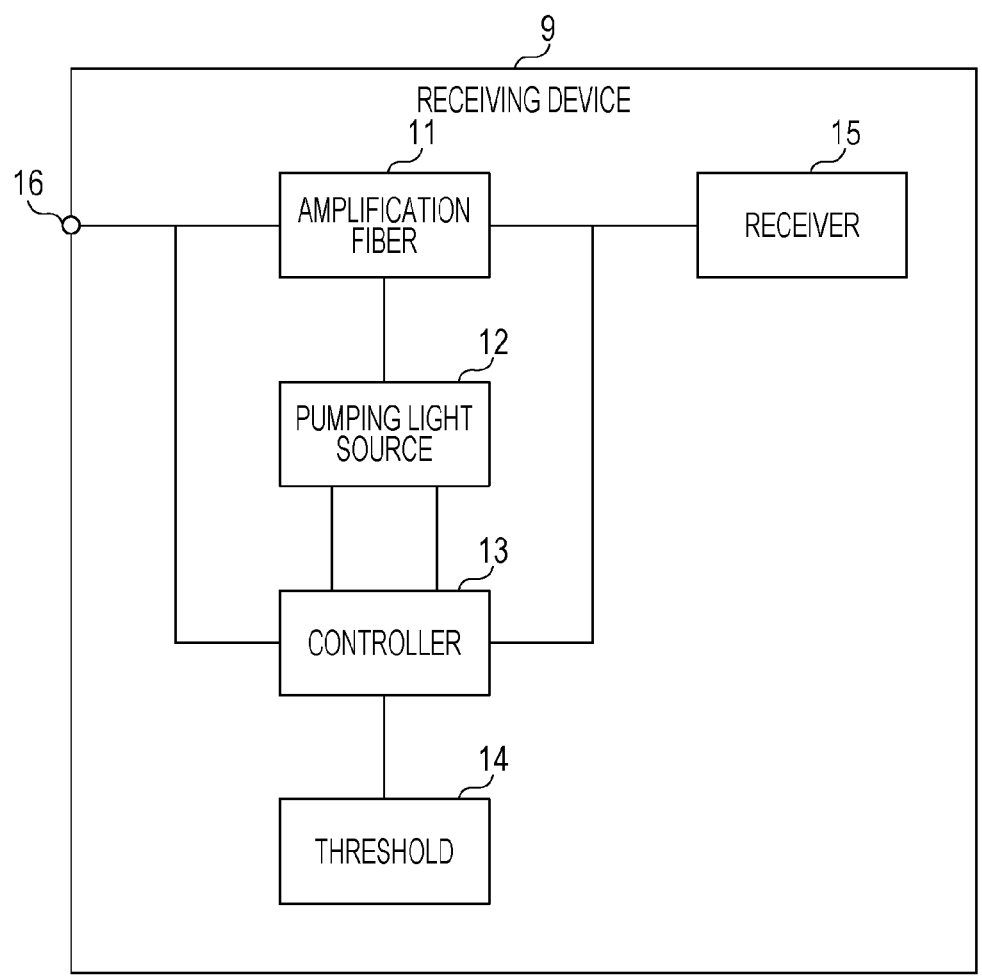
FIG. 2 is a diagram illustrating an example of a receiving device according to an embodiment.
Figure 3:
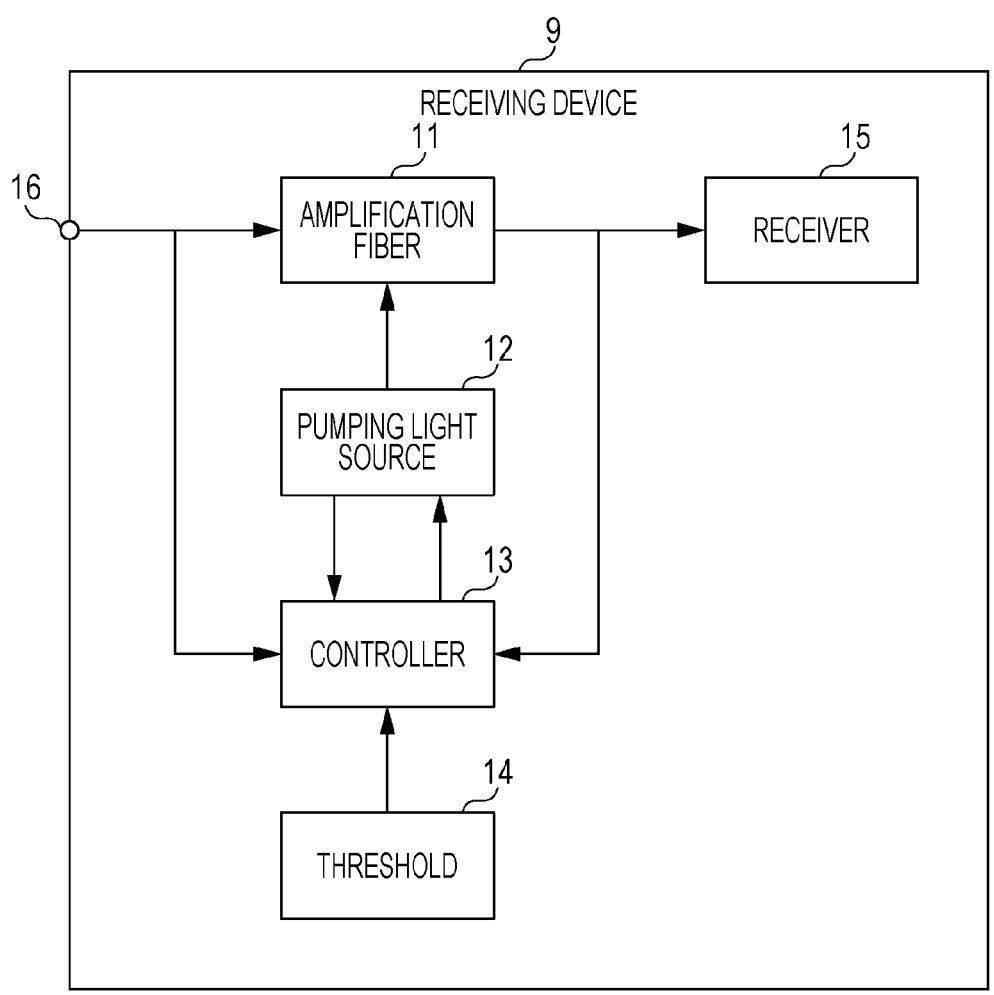
FIG. 3 is a diagram illustrating signal flow according to the receiving device illustrated in FIG. 2.

FIG. 2 is a diagram illustrating an example of a receiving device according to an embodiment. FIG. 3 is a diagram illustrating the flow of signals in the receiving device illustrated in FIG. 2. As illustrated in FIGS. 2 and 3, the receiving device 9 may have an amplification fiber 11, pumping light source 12, controller 13, threshold 14, and receiver 15, for example.

The amplification fiber 11 is connected to an input port 16. The input port 16 is connected to the demultiplexer 8 (see FIG. 1) of the drop unit 6. Upon the pumping light being supplied from the pumping light source 12 to the amplification fiber 11, the amplification fiber 11 amplifies the signal light input from the input port 16. Also, when the supply of pumping light is stopped, the amplification fiber 11 attenuates the signal light that is input from the input port 16. The amplification fiber 11 has properties of amplifying or attenuating the signal light input in the amplification fiber 11, so that the output level of the signal light that is output from the amplification fiber 11 is contained within the dynamic range of the receiver 15.

Figure 4:
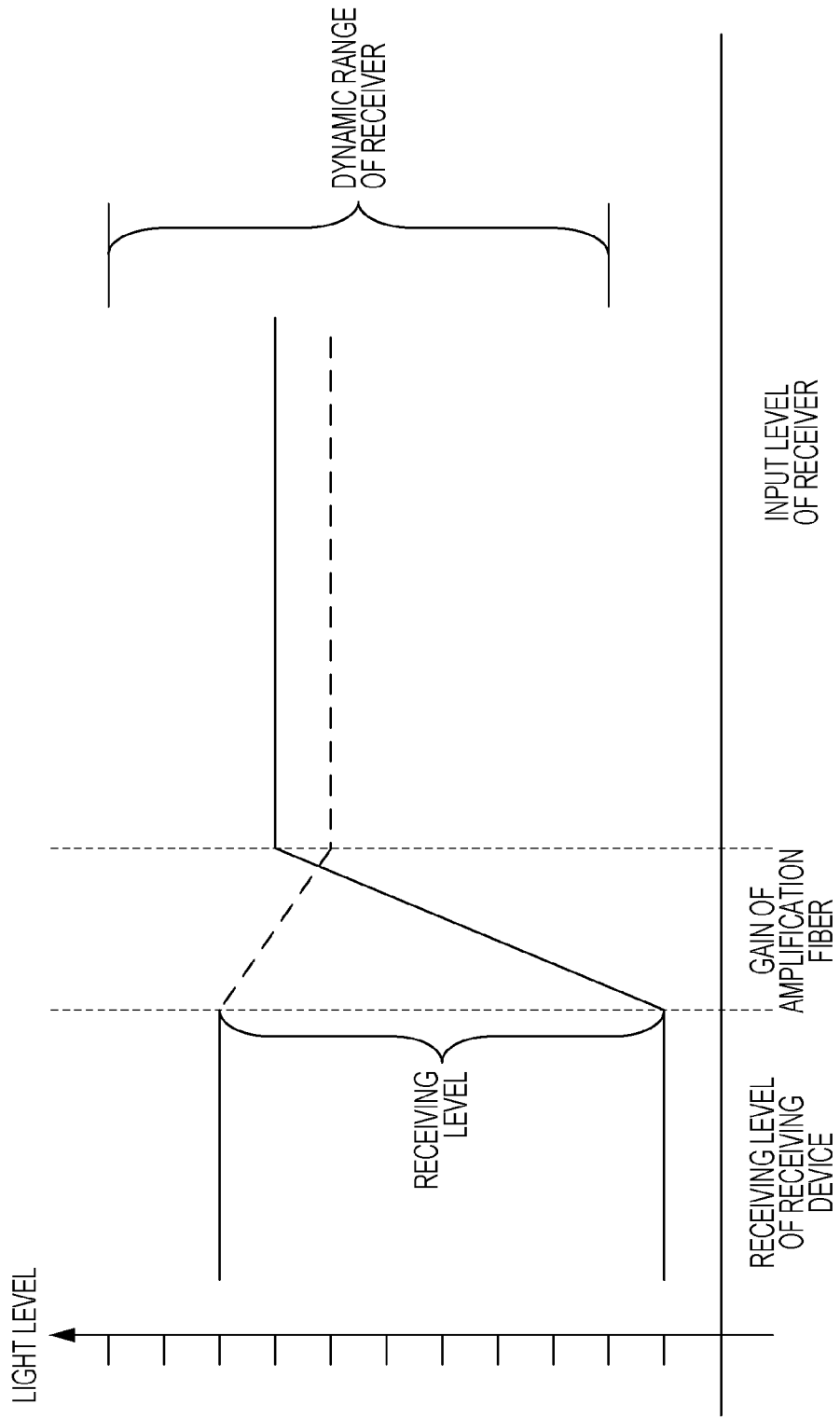
FIG. 4 is a diagram illustrating the relation between the receiving level of the receiving device and receiving level of the receiver illustrated in FIG. 2.

FIG. 4 is a diagram illustrating the relation between the receiving level of the receiving device and then receiving level of the receiver illustrated in FIG. 2. As illustrated in FIG. 4, in the case that the receiving level of the receiving device is low, the signal light is amplified by the amplification fiber 11. On the other hand, in the case that the receiving level of the receiving device is high, the signal light is attenuated by the amplification fiber 11. Thus, whether the input level of the signal light that is input in the amplification fiber 11 is high or low, the input level of signal light input in the receiver 15 is contained within the dynamic range of the receiver 15.

An example of amplification fiber 11 may be a rare-earth doped optical fiber. An example of rare-earth doped optical fiber may be an erbium-doped optical fiber. Erbium-doped optical fiber is an optical amplifier that uses stimulated emission of rare-earth erbium. Erbium-doped optical fibers may amplify signal light in a 1.55 µm band or 1.58 µm band, for example.

Properties of erbium-doped optical fibers change depending on a variety of parameters such as fiber length, erbium doping concentration, signal light wavelength, and input levels and gain of the signal light to the erbium-doped optical fiber. The amplification properties of the erbium-doped optical fiber are determined by the ratio between absorption and emission. Upon the supply of pumping light being stopped, absorption takes up a greater ratio. Thus, the signal light may be attenuated when the supply of pumping light is stopped. The gain and length of the erbium-doped optical fiber are adjusted and the amount of absorption of the erbium-doped optical fiber when the pumping light is stopped is suppressed, whereby properties of amplification and attenuation as illustrated in FIG. 4 may be realized.

Note that according to the wavelength of the signal light to be amplified, rare-earth doped optical fibers other than erbium-doped optical fibers may be used. For example, the signal light of a 1.5 µm band may be amplified by using thulium-doped optical fibers. Alternatively, the signal light of a 1.3 µm band may be amplified by using praseodymium-doped optical fibers.

As illustrated in FIG. 3, the receiver 15 is connected to the amplification fiber 11. The receiver 15 receives the signal light output from the amplification fiber 11. An example of a receiver 15 may be, for example, a digital coherent receiver. A digital coherent receiver receives signal light, and performs digital signal process as to an electrical signal that is generated from the signal light by photoelectric conversion, thereby performing compensation as to changes in properties such as dispersion.

The pumping light source 12 is connected to the amplification fiber 11. The pumping light source 12 supplies pumping light to the amplification fiber 11. An example of a pumping light source 12 may be a laser diode (LD) called a pump laser.

The controller 13 is connected to the pumping light source 12. The controller 13 may monitor the input level of the signal light input into the amplification fiber 11. The controller 13 may monitor the output level of the signal light output from the amplification fiber 11. The controller 13 may monitor driving parameters of the pumping light source 12.

Alternatively, the controller 13 may monitor one or a combination of two or three of the input level of the signal light input into the amplification fiber 11, the output level of the signal light output from the amplification fiber 11, and the driving parameters of the pumping light source 12. Examples of a driving parameter of the pumping light source 12 may be output power of the pumping light output from the pumping light source 12 or driving current in order to output the pumping light from the pumping light source 12.

A threshold 14 is provided to the controller 13. The threshold 14 may be stored in a memory, for example. Examples of a threshold 14 may be an input threshold, output threshold, or driving threshold. An input threshold is a threshold as to the input level of signal light that is input to the amplification fiber 11. The output threshold is the threshold as to the output level of the signal light output from the amplification fiber 11. The driving threshold is a threshold as to the driving parameters of the pumping light source 12.

In the case that the input level of the signal light input into the amplification fiber 11 is lower than the input threshold, the controller 13 may drive the pumping light source 12. In the case that the input level of signal light input into the amplification fiber 11 is higher than the input threshold, the controller 13 may stop the driving of the pumping light source 12.

In the case that the output level of the signal light output from the amplification fiber 11 is lower than the output threshold, the controller 13 may drive the pumping light source 12. In the case that the output level of signal light output from the amplification fiber 11 is higher than the output threshold, the controller 13 may stop the driving of the pumping light source 12.

In the case that the driving parameter of the pumping light source 12 is greater than the driving threshold, the controller 13 may drive the pumping light source 12. In the case that the driving parameter of the pumping light source 12 is less than the driving threshold, the controller 13 may stop the driving of the pumping light source 12.

By the pumping light source 12 being driven, pumping light is supplied from the pumping light source 12 to the amplification fiber 11. By the driving of the pumping light source 12 being stopped, the supply of pumping light from the pumping light source 12 to the amplification fiber 11 is stopped.

Figure 5:
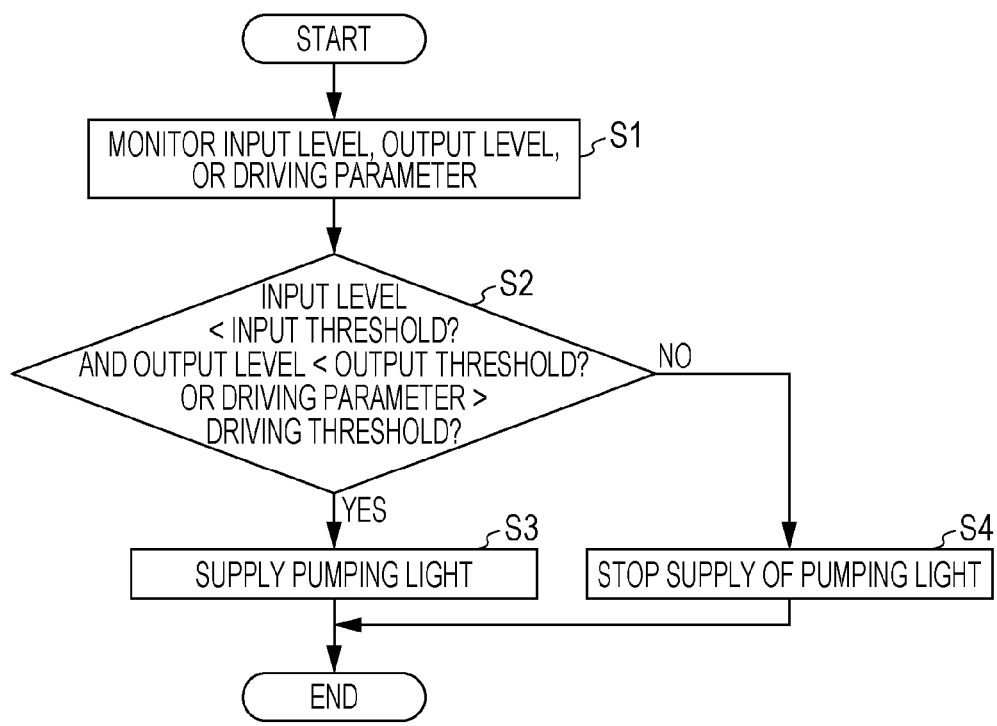
FIG. 5 is a diagram illustrating an example of a receiving method according to an embodiment.

FIG. 5 is a diagram illustrating an example of a receiving method according to an embodiment. The receiving method illustrated in FIG. 5 may be executed with the receiving device illustrated in FIG. 2. In the present embodiment, a case of the receiving device illustrated in FIG. 2 executing the receiving method illustrated in FIG. 5 will be described.

As illustrated in FIG. 5, upon reception of the signal light started in the receiving device 9, the controller 13 monitors the input level of the signal light that is input into the amplification fiber 11. Also, the controller 13 may monitor the output level of the signal light output from the amplification fiber 11. Also, the controller 13 may monitor the driving parameter of the pumping light source 12. Alternatively, the controller 13 may monitor two or three of the signal light input level, signal light output level, and pumping light source 12 driving parameter (operation S1).

Next, the controller 13 references the threshold 14. The controller 13 determines whether or not the input level of the signal light that is input into the amplification fiber 11 is lower than the input threshold. Also, the controller 13 may determine whether or not the output level of the signal light output from the amplification fiber 11 is lower than the output threshold. Also, the controller 13 may determine whether or not the driving parameter of the pumping light source 12 is greater than the driving threshold. Alternatively, the controller 13 may monitor two or three of whether or not the signal light input level is lower than the input threshold, whether or not the signal light output level is lower than the output threshold, and whether or not the pumping light source 12 driving parameter is greater than the driving threshold (operation S2).

In operation S2, let us say that determination will be made of whether or not the condition of the signal light input level is satisfied. In the case that the input level is lower than the input threshold (Yes in operation S2), the controller 13 drives the pumping light source 12. Thus, pumping light is supplied to the amplification fiber 11 from the pumping light source 12 (operation S3). On the other hand, in the case that the input level is not lower than the input threshold (No in operation S2), the controller 13 stops the driving of the pumping light source 12. Thus, the supply of the pumping light to the amplification fiber 11 from the pumping light source 12 is stopped (operation S4). Thus, a series of processing is ended.

In operation S2, let us say that determination will be made of whether or not the condition of the signal light output level is satisfied. In the case that the output level is lower than the output threshold (Yes in operation S2), the controller 13 drives the pumping light source 12. Thus, pumping light is supplied to the amplification fiber 11 from the pumping light source 12 (operation S3). On the other hand, in the case that the input level is not lower than the input threshold (No in operation S2), the controller 13 stops the driving of the pumping light source 12. Thus, the supply of the pumping light to the amplification fiber 11 from the pumping light source 12 is stopped (operation S4). Thus, a series of processing is ended.

In operation S2, let us say that determination will be made of whether or not the condition of the driving parameter of the pumping light source 12 is satisfied. In the case that the driving parameter is greater than the driving threshold (Yes in operation S2), the controller 13 drives the pumping light source 12. Thus, pumping light is supplied to the amplification fiber 11 from the pumping light source 12 (operation S3). On the other hand, in the case that the driving parameter is not greater than the driving threshold (No in operation S2), the controller 13 stops the driving of the pumping light source 12. Thus, the supply of the pumping light to the amplification fiber 11 from the pumping light source 12 is stopped (operation S4). Thus, a series of processing is ended.

In operation S2, let us say that determination will be made of whether or not the condition of the signal light input level and the condition of the signal light output level are satisfied. In the case that the input level is lower than the input threshold, and the output level is lower than the output threshold (Yes in operation S2), the controller 13 drives the pumping light source 12. Thus, pumping light is supplied to the amplification fiber 11 from the pumping light source 12 (operation S3). On the other hand, in the case that the input level is not lower than the input threshold, or the output level is not lower than the output threshold (No in operation S2), the controller 13 stops the driving of the pumping light source 12. Thus, the supply of the pumping light to the amplification fiber 11 from the pumping light source 12 is stopped (operation S4). Thus, a series of processing is ended.

In operation S2, let us say that determination will be made of whether or not the condition of the signal light input level and the condition of the driving parameter of the pumping light source 12 are satisfied. In the case that the input level is lower than the input threshold, and the driving parameter is greater than the driving threshold (Yes in operation S2), the controller 13 drives the pumping light source 12. Thus, pumping light is supplied to the amplification fiber 11 from the pumping light source 12 (operation S3). On the other hand, in the case that the input level is not greater than the input threshold, or the driving parameter is not lower than the driving threshold (No in operation S2), the controller 13 stops the driving of the pumping light source 12. Thus, the supply of the pumping light to the amplification fiber 11 from the pumping light source 12 is stopped (operation S4). Thus, a series of processing is ended.

In operation S2, let us say that determination will be made of whether or not the condition of the signal light output level and the condition of the driving parameter of the pumping light source 12 are satisfied. In the case that the output level is lower than the output threshold, and the driving parameter is greater than the driving threshold (Yes in operation S2), the controller 13 drives the pumping light source 12. Thus, pumping light is supplied to the amplification fiber 11 from the pumping light source 12 (operation S3). On the other hand, in the case that the output level is not greater than the output threshold, or the driving parameter is not lower than the driving threshold (No in operation S2), the controller 13 stops the driving of the pumping light source 12. Thus, the supply of the pumping light to the amplification fiber 11 from the pumping light source 12 is stopped (operation S4). Thus, a series of processing is ended.

In operation S2, let us say that determination will be made of whether or not the condition of the signal light input level, the condition of the signal light output level, and the condition of the driving parameter of the pumping light source 12 are satisfied. In the case that the input level is lower than the input threshold, the output level is lower than the output threshold, and the driving parameter is greater than the driving threshold (Yes in operation S2), the controller 13 drives the pumping light source 12. Thus, pumping light is supplied to the amplification fiber 11 from the pumping light source 12 (operation S3). On the other hand, in the case that the input level is not lower than the input threshold, the output level is not lower than the output threshold, or the driving parameter is not greater than the driving threshold (No in operation S2), the controller 13 stops the driving of the pumping light source 12. Thus, the supply of the pumping light to the amplification fiber 11 from the pumping light source 12 is stopped (operation S4). Thus, a series of processing is ended.

According to the receiving device 9 illustrated in FIG. 2 and the receiving method illustrated in FIG. 5, the signal light is amplified or attenuated by the amplification fiber 11, so as to be contained within the dynamic range of the receiver 15. Accordingly, by not having to provide an optical attenuator, power may be reduced by the amount consumed by the optical attenuator. Also, by not having to temporarily amplify the signal light input into the receiving device 9 to a level exceeding the dynamic range of the receiver 15, power may be reduced by the amount consumed by driving the pumping light source 12.

Second Embodiment

Figure 6:
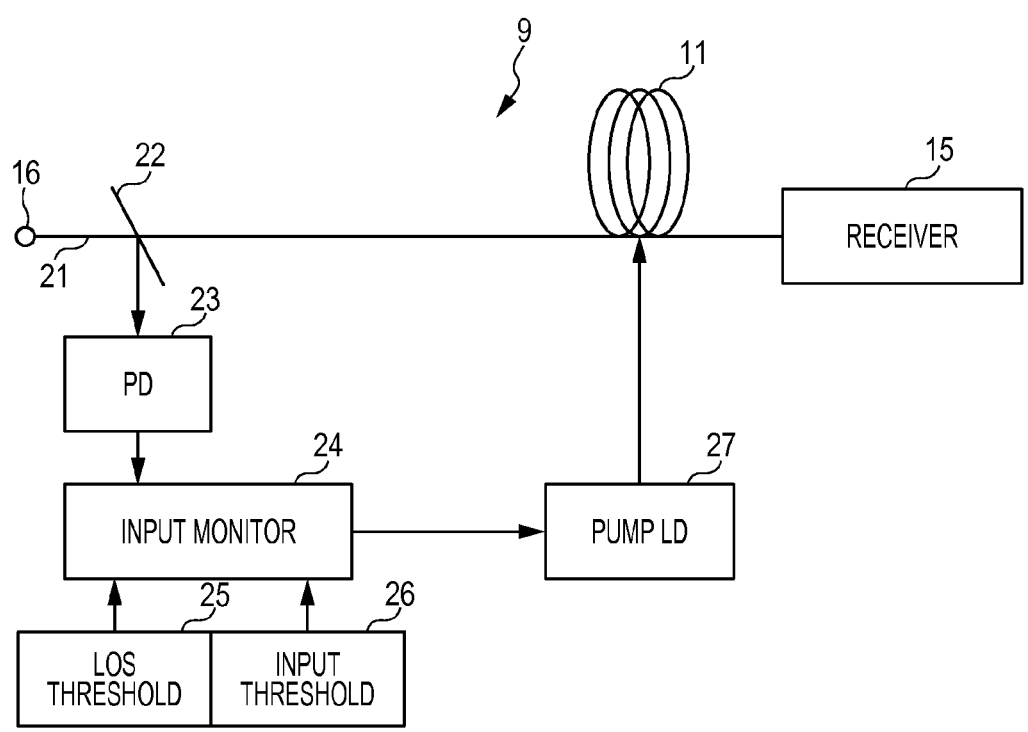
FIG. 6 is a diagram illustrating another example of a receiving device according to an embodiment.

FIG. 6 is a diagram illustrating another receiving device according to an embodiment. As illustrated in FIG. 6, the receiving device 9 may have an optical transmission line 21, optical coupler 22, photodiode (PD) 23, input monitor 24, loss-of-signal (LOS) threshold 25, input threshold 26, amplification fiber 11, pump LD 27, and receiver 15, for example. The PD 23 and input monitor 24 are examples of a controller. The pump LD 27 is an example of a pumping light source.

The optical transmission line 21 is connected to the input port 16. The optical transmission line 21 is a transmission path for signal light. Examples of an optical transmission line 21 may be an optical fiber or optical waveguide.

The optical coupler 22 is connected to the optical transmission line 21. The optical coupler 22 splits the signal light input from the optical transmission path 21 into two directions.

The amplification fiber 11 is connected to the output port on one side of the optical coupler 22. The amplification fiber 11 is connected to the pump LD 27. The amplification fiber 11 amplifies the signal light output from one of the output ports of the optical coupler 22 in the case that pumping light is supplied from the pump LD 27, and attenuates the signal light in the case that the supply of pumping light from the pump LD 27 is stopped. The properties and details of the amplification fiber 11 are as described in the description of the receiving device 9 illustrated in FIG. 2, so redundant description will be omitted.

The receiver 15 is connected to the amplification fiber 11. The receiver 15 receives the signal light output from the amplification fiber 11.

The PD 23 is connected to the other output port of the optical coupler 22. The PD 23 receives the signal light output from the other output port of the optical coupler 22, and converts this to an electrical signal corresponding to the input level of the signal light.

The input monitor 24 is connected to the PD 23. The input monitor 24 monitors the input level of the signal light input into the amplification fiber 11, based on the electrical signal supplied from the PD 23.

A LOS threshold 25 and input threshold 26 are provided to the input monitor 24. The LOS threshold 25 and input threshold 26 may be stored in a memory, for example. The LOS threshold 25 and input threshold 26 are thresholds to stop the amplification of signal light by the amplification fiber 11. The input threshold 26 is a higher level than the LOS threshold 25. In the case that the input level of signal light to the receiving device 9 is higher than the input threshold 26, the input monitor 24 outputs a stop signal to the pump LD 27. Thus, the supply of pumping light from the pump LD 27 to the amplification fiber 11 is stopped, and the signal light is attenuated by the amplification fiber 11.

In the case that the input level of the signal light to the receiving device 9 is lower than the LOS threshold 25, it may be difficult to satisfy properties such as optical amplification properties and proof strength to sudden changes in an optical level. Thus, in the case that the input level of the signal light into the receiving device 9 is lower than the LOS threshold 25, the input monitor 24 outputs a stop signal to the pump LD 27. Thus, the supply of pumping light to the amplification fiber 11 from the pump LD 27 is stopped, and amplification of the signal light by the amplification fiber 11 is stopped, whereby properties such as optical amplification properties and proof strength to sudden changes in an optical level may be satisfied.

The pump LD 27 is connected to the input monitor 24. Upon receiving a stop signal from the input monitor 24, the pump LD 27 stops the driving, and stops the output of pumping light.

Figure 7:
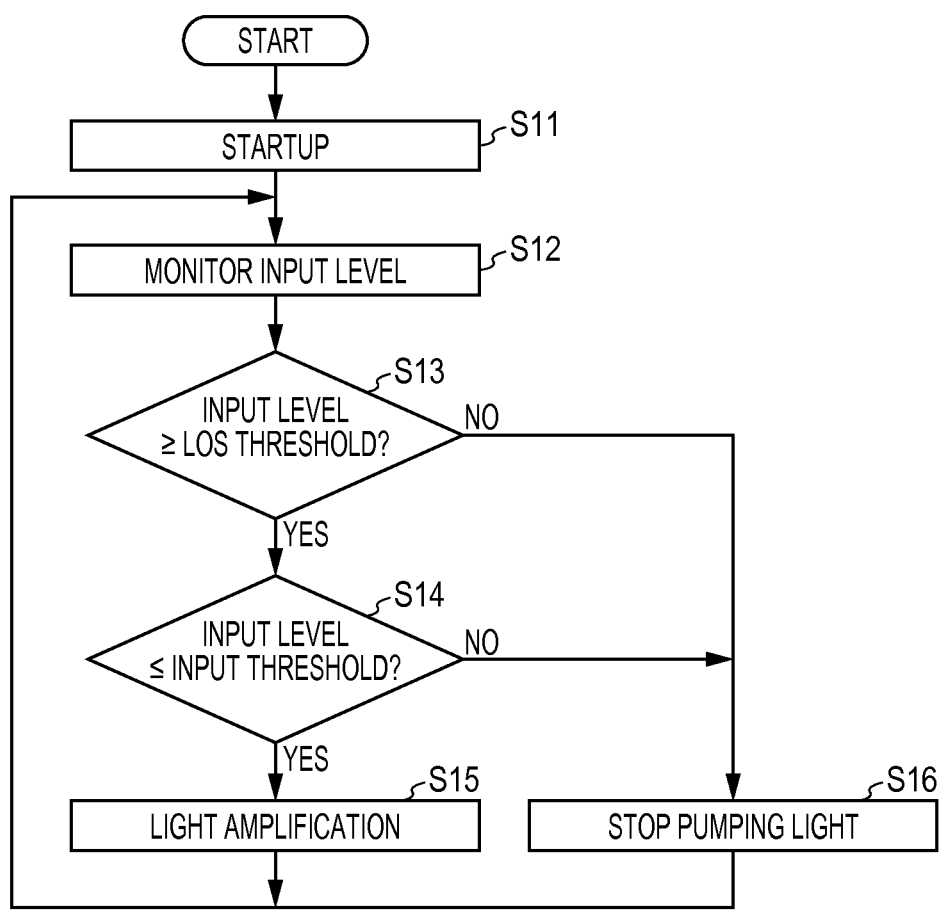
FIG. 7 is a diagram illustrating an example of a receiving method according to the receiving device illustrated in FIG. 6.

FIG. 7 is a diagram illustrating an example of a receiving method of the receiving device illustrated in FIG. 6. As illustrated in FIG. 7, upon the receiving device 9 being started up (operation S11), the input monitor 24 monitors the input level of the signal light input into the amplification fiber 11 (operation S12). The input monitor 24 then decides whether or not the input level being monitored is at or above the LOS threshold or not (operation S13).

In the case that the input level is at or above the LOS threshold (Yes in operation S13), the input monitor 24 determines whether or not the input level being monitored is at or below the input threshold (operation S14). In the case that the input level is at or below the input threshold (Yes in operation S14), the input monitor 24 does not output a stop signal to the pump LD 27. Thus, the pump LD 27 is driven, pumping light is supplied from the pump LD 27 to the amplification fiber 11, and signal light is amplified by the amplification fiber 11 (operation S15).

The control as to the pump LD 27 at this time may be an Auto Current Control (ACC) that controls the driving current of the pump LD 27 so as to be held at a certain level, for example. Auto Current Control is an example of an open loop control. Returning to operation S12, the operations S12 through S16 are repeated.

On the other hand, in the case that the input level is not at or greater than the LOS threshold (No in operation S13), or in the case that the input level is not at or below the input threshold (No in operation S14), the input monitor 24 outputs a stop signal to the pump LD 27. Thus, the driving of the pump LD 27 is stopped, and supply of the pumping light from the pump LD 27 to the amplification fiber 11 is stopped (operation S16). Returning to operation S12, the operations S12 through S16 are repeated.

According to the receiving device 9 illustrated in FIG. 6 and the receiving method illustrated in FIG. 7, the driving and the stopping driving of the pump LD 27 is controlled based on the input level of the signal light input into the amplification fiber 11. Thus, the signal light is amplified or attenuated by the amplification fiber 11 so as to be contained within the dynamic range of the receiver 15. Accordingly, by not having to provide an optical attenuator, the power may be reduced in the amount that would be consumed by the optical attenuator. Also, by not having to temporarily amplify the signal light input into the receiving device 9 to a level that exceeds the dynamic range of the receiver 15, the power that is consumed to drive the pump LD 27 may be reduced.

Third Embodiment

Figure 8:
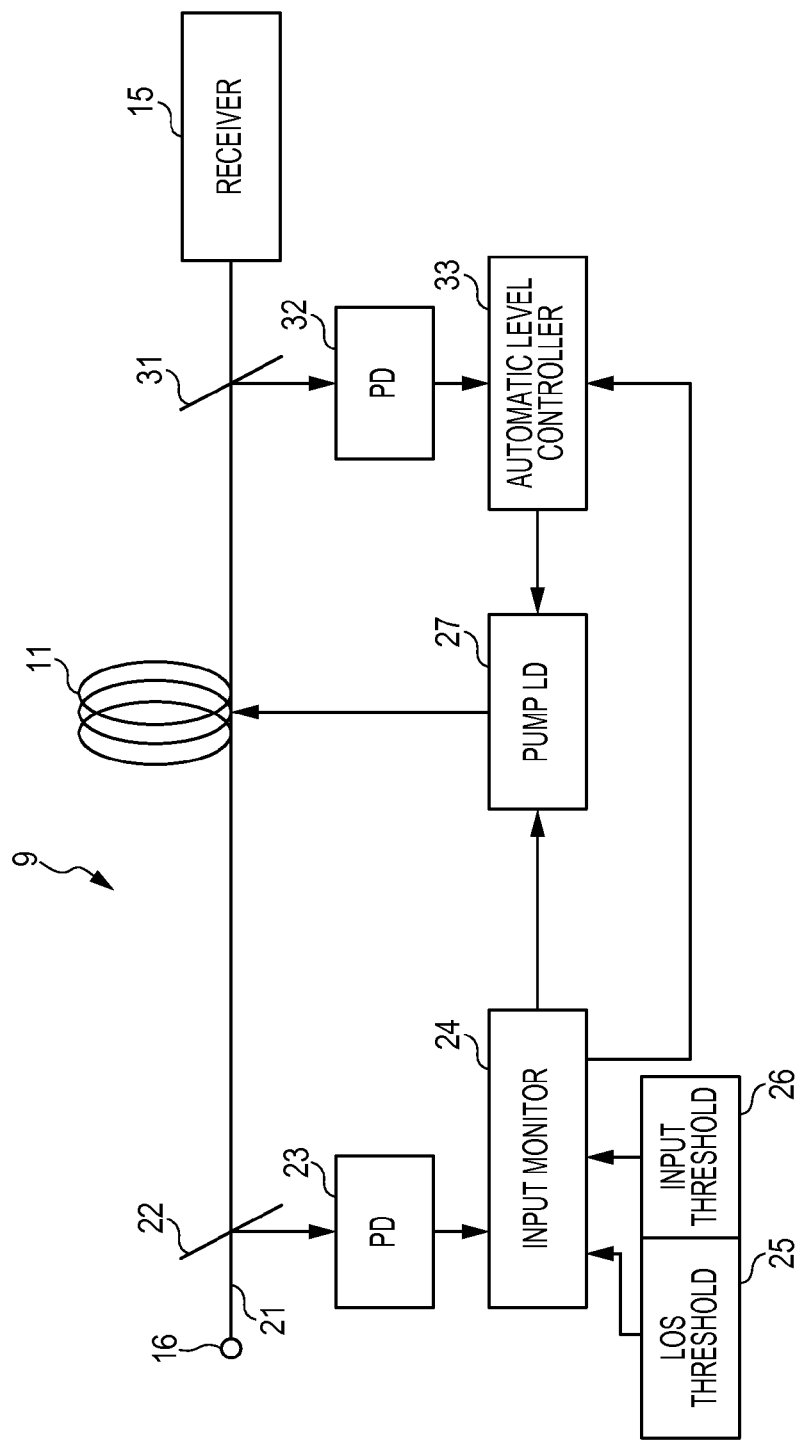
FIG. 8 is a diagram illustrating another example of a receiving device according to an embodiment.

FIG. 8 is a diagram illustrating another example of a receiving device according to an embodiment. As illustrated in FIG. 8, the receiving device 9 may have an optical transmission line 21, optical coupler 22, PD 23, input monitor 24, LOS threshold 25, input threshold 26, amplification fiber 11, pump LD 27, receiver 15, optical coupler 31, PD 32, and automatic level controller (ALC) 33.

The PD 23, input monitor 24, PD 32, and automatic level controller 33 are examples of a controller. The optical transmission line 21, optical coupler 22, PD 23, input monitor 24, LOS threshold 25, input threshold 26, amplification fiber 11, pump LD 27, and receiver 15 are as described in the description of the receiving device 9 illustrated in FIG. 6, so redundant description will be omitted.

The optical coupler 31 is connected to the output port of the amplification fiber 11. The optical coupler 31 splits the signal light output from the amplification fiber 11 into two directions.

The receiver 15 is connected to one of the output ports of the optical coupler 31. The receiver 15 receives signal light output from one of the output ports of the optical coupler 31.

The PD 32 is connected to the other output port of the optical coupler 31. The PD 32 receives the signal light output from the other output port of the optical coupler 31, and converts this into an electrical signal corresponding to the output level of the signal light output from the amplification fiber 11.

The automatic level controller 33 is connected to the PD 32. The automatic level controller 33 performs signal output automatic level control (ALC) that controls the output power of the pump LD 27 so that the output level of the signal light output from the amplification fiber 11 is maintained at an invariable level as to the pump LD 27, for example, based on electric signals supplied from the PD 32. The automatic level control is an example of feedback control.

Upon receiving instructions from the input monitor 24 to change the control method as to the pump LD 27, the automatic level controller 33 changes the control method as to the pump LD 27. For example, the automatic level controller 33 may change the control method as to the pump LD 27 from automatic level control to automatic current control. In automatic current control after a change, the driving current amount of the pump LD 27 may be set to a current amount at or below the driving current amount of when automatic level control is being performed, and the output level of the pumping light output from the pump LD 27 may be a lower level than when automatic level control is being performed. Automatic current control is an example of control that stops the feedback control.

The input monitor 24 monitors the input level of the signal light input into the amplification fiber 11, based on electric signals supplied from the PD 32. The input monitor 24 outputs the instructions for changing the control method as to the pump LD 27 to the automatic level controller 33 according to the input level being monitored.

In the description of the receiving device 9 illustrated in FIG. 8, the threshold written as "input threshold" in the description of the receiving device 9 illustrated in FIG. 6 is re-read as "first input threshold". Let us say that the input threshold 26 has a first input threshold and a second input threshold. The second input threshold is a lower level than the first input threshold, and is a higher level than the LOS threshold 25. The first input threshold is a threshold to stop the amplification of signal light by the amplification fiber 11. The second input threshold is a threshold to change the control method as to the pump LD 27.

In the case that the input level of the signal light to the receiving device 9 is higher than the first input threshold, the input monitoring unit 24 outputs a stop signal to the pump LD 27. Thus, the supply of pumping light from the pump LD 27 to the amplification fiber 11 is stopped, and the signal light is attenuated by the amplification fiber 11.

In the case that the input level of the signal light to the receiving device 9 is higher than the second input threshold and is lower than the first input threshold, the input monitoring unit 24 outputs instructions to the automatic level controller 33 to change the control method as to the pump LD 27. Thus, the control method as to the pump LD 27 is changed.

In the case that the input level of the signal light to the receiving device 9 is higher than the LOS threshold 25, and is lower than the second input threshold, the input monitoring unit 24 outputs instructions to the automatic level controller 33 to change the control method as to the pump LD 27. Thus, the automatic level controller 33 performs automatic level control as to the pump LD 27.

In the case that the input level of the signal light to the receiving device 9 is lower than the LOS threshold 25, the input monitor 24 outputs a stop signal to the pump LD 27. Thus, the supply of pumping light from the pump LD 27 to the amplification fiber 11 is stopped, and the amplification of the signal light by the amplification fiber 11 is stopped, whereby properties such as optical amplification properties and proof strength to sudden changes in an optical level may be satisfied.

Figure 9:
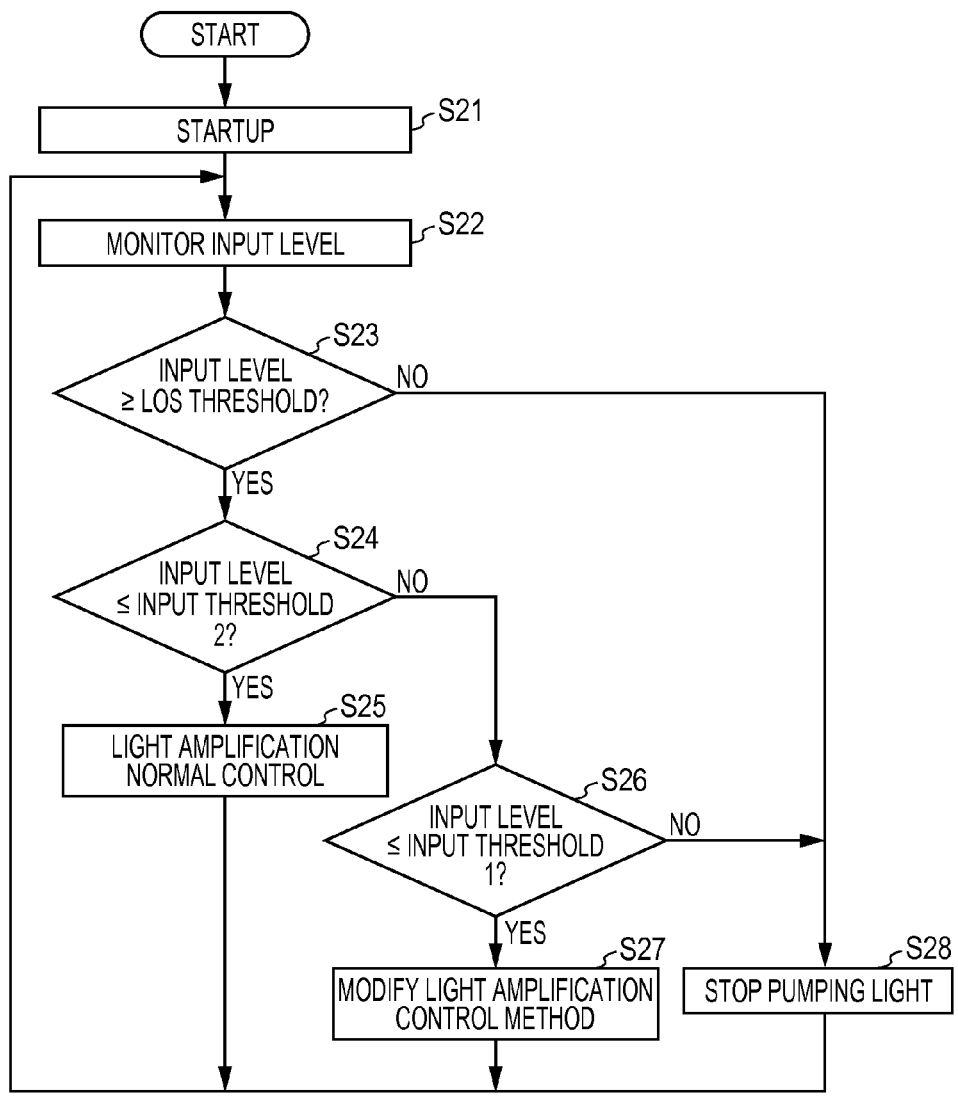
FIG. 9 is a diagram illustrating an example of a receiving method according to the receiving device illustrated in FIG. 8.

FIG. 9 is a diagram illustrating an example of a receiving method by the receiving device illustrated in FIG. 8. Note that in FIG. 9, "first input threshold" is expressed as "input threshold 1" and "second input threshold" is expressed as "input threshold 2".

As illustrated in FIG. 9, upon the receiving device 9 being started up (operation S21), the input monitor 24 monitors the input level of the signal light being input into the amplification fiber 11 (operation S22). The input monitor 24 then determines whether or not the input level being monitored is at or above the LOS threshold (operation S23).

In the case that the input level is at or above the LOS threshold (Yes in operation S23), the input monitor 24 determines whether or not the input level being monitored is at or below the second input threshold (operation S24). In the case that the input level is at or below the second input threshold (Yes in operation S24), the input monitor 24 does not output change instructions for a stop signal to the pump LD 27 and a control method to the automatic level controller 33.

Thus, the pump LD 27 is driving by a normal control method, e.g. automatic level control. Accordingly, pumping light is supplied from the pump LD 27 to the amplification fiber 11, and the signal light is amplified by the amplification fiber 11 (operation S25). Returning to the operation S22, the operations S22 through S28 are repeated.

On the other hand, in the case that the input level is not at or below the second input threshold (No in operation S24), the input monitor 24 determines whether or not the input level is at or below the first input threshold (operation S26). In the case that the input level is at or below the first input threshold (Yes in operation S26), the input monitor 24 does not output the stop signal to the pump LD 27, and outputs instructions to the automatic level controller 33 to change the control method.

Thus, the pump LD 27 is driven by a control method after the change, e.g. automatic current control. Accordingly, pumping light of a low output level is supplied from the pump LD 27 to the amplification fiber 11, and the signal light is amplified by the amplification fiber 11 (operation S27). Returning to the operation S22, the operations S22 through S28 are repeated.

On the other hand, in the case that the input level is not at or above the LOS threshold (No in operation S23), or in the case that the input level is not at or below the first input threshold (No in operation S26), the input monitor 24 outputs a stop signal to the pump LD 27. Thus, the driving of the pump LD 27 is stopped, and the supply of pumping light from the pump LD 27 to the amplification fiber 11 is stopped (operation S28). Returning to the operation S22, the operations S22 through S28 are repeated.

According to the receiving device illustrated in FIG. 8 and the receiving method illustrated in FIG. 9, the driving of the pump LD 27 and the control method for stopping the driving and driving, are controlled based on the input level of the signal light input into the amplification fiber 11. Thus, the signal light is amplified or attenuated by the amplification fiber 11 so as to be contained within the dynamic range of the receiver 15. Accordingly, by not having to provide an optical attenuator, power may be reduced in the amount that would be consumed by an optical attenuator. Also, by not having to temporarily amplify the signal light input into the receiving device 9 to a level exceeding the dynamic range of the receiver 15, the power that would be consumed by driving the pump LD 27 may be reduced.

Also, in case that automatic level control is performed when the input level of the signal light input into the amplification fiber 11 is somewhat high, for example if higher than the second input threshold, the driving current amount of the pump LD 27 becomes smaller and feedback control as to the output of the pump LD 27 may become difficult. For example, by the control method as to the pump LD 27 switching to automatic current control based on the input level of the signal light input into the amplification fiber 11, the control method is switched from feedback control to open loop control. Thus, control as to the pump LD 27 becoming difficult may be avoided.

Also, in the automatic current control, the driving current amount of the pump LD 27 is set to a current amount at or below the driving current amount according to automatic level control. Thus, the power that would be consumed to drive the pump LD 27 may be reduced.

Fourth Embodiment

Figure 10:
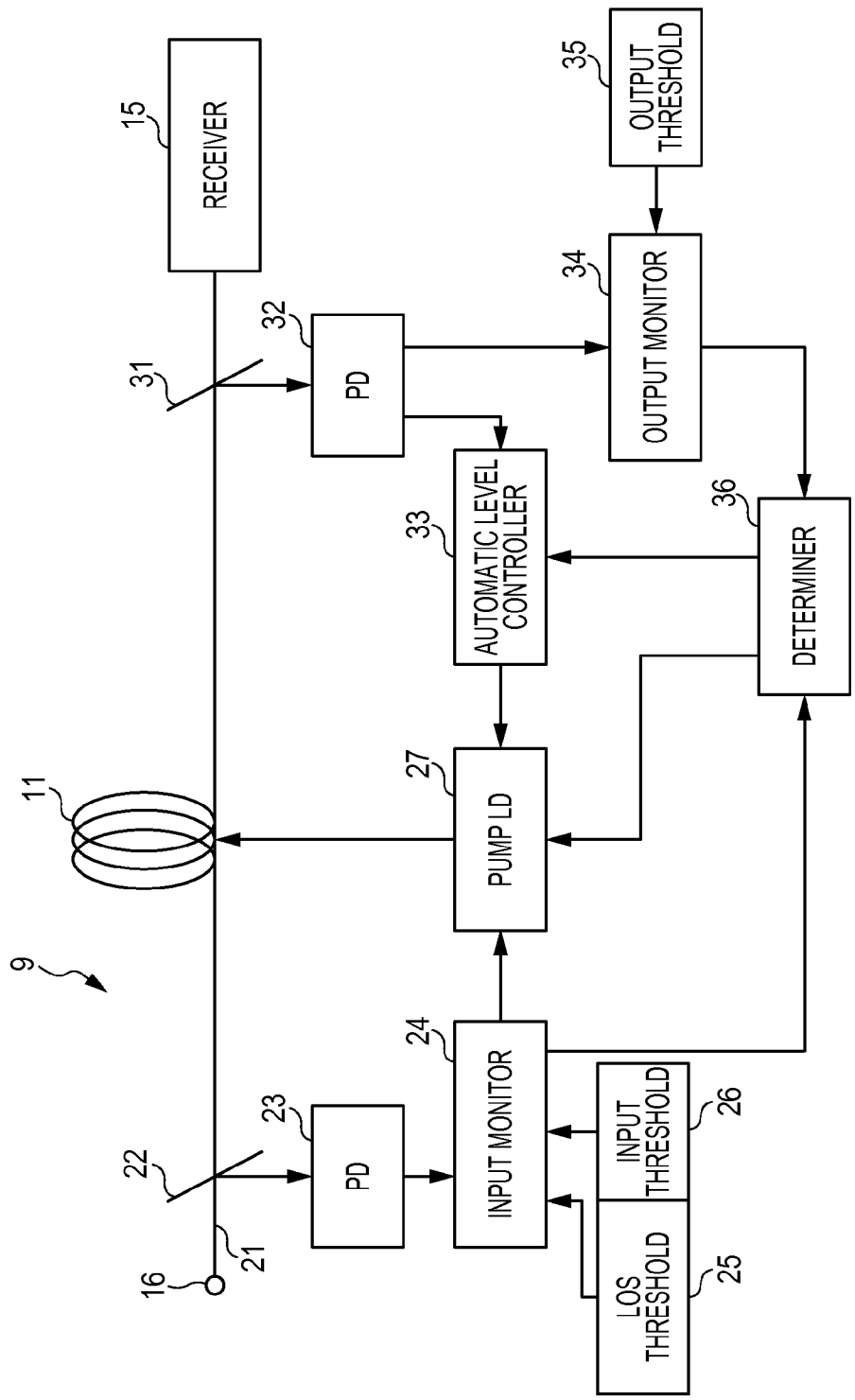
FIG. 10 is a diagram illustrating another example of a receiving device according to an embodiment.

FIG. 10 is a diagram illustrating another example of the receiving device according to the embodiment. As illustrated in FIG. 10, the receiving device 9 may have an optical transmission line 21, optical coupler 22, PD 23, input monitor 24, LOS threshold 25, input threshold 26, amplification fiber 11, pump LD 27, receiver 15, optical coupler 31, PD 32, automatic level controller 33, output monitor 34, output threshold 35, and determiner 36.

The PD 23, input monitor 24, PD 32, automatic level controller 33, output monitor 34, and determiner 36 are examples of a controller. The optical transmission line 21, optical coupler 22, PD 23, input monitor 24, LOS threshold 25, input threshold 26, amplification fiber 11, pump LD 27, receiver 15, optical coupler 31, PD 32, and automatic level controller 33 are as described in the description of the receiving device 9 illustrated in FIG. 8, so redundant description will be omitted.

The output monitoring unit 34 is connected to the PD 32. The output monitor 34 monitors the output level of the signal light output from the amplification fiber 11, based on the electrical signal supplied from the PD 32. The output threshold 35 is provided to the output monitor 34. The output threshold 35 may be stored in a memory, for example.

Let us say that the output threshold 35 has a first output threshold and a second output threshold. The second output threshold is at a level that is lower than the first output threshold. The first output threshold is a threshold to stop the amplification of the signal light by the amplification fiber 11. The second output threshold is a threshold to change the control method as to the pump LD 27.

Accordingly, the output monitor 34 determines whether the output level being monitored is higher or lower than the first output threshold. Also, the output monitor 34 determines whether the output level being monitored is higher or lower than the second output threshold. The output monitor 34 outputs the determination results to the determining unit 36.

The input monitor 24 monitors the input level of the signal light input into the amplification fiber 11, based on the electrical signal supplied from the PD 23. The input monitor 24 determines whether or not the input level being monitored is higher or lower than the first input threshold. Also, the input monitor 24 determines whether the input level being monitored is higher or lower than the second input threshold. The first input threshold and second input threshold are as described in the description of the receiving device 9 illustrated in FIG. 8, so redundant description will be omitted. The input monitor 24 outputs the determination results to the determining unit 36.

In the case that the input level of the signal light input into the amplification fiber 11 is lower than the LOS threshold 25, the input monitor 24 outputs a stop signal to the pump LD 27. Thus, the supply of pumping light from the pump LD 27 to the amplification fiber 11 is stopped, and amplification of the signal light by the amplification fiber 11 is stopped, whereby properties such as optical amplification properties and proof strength to sudden changes in an optical level may be satisfied.

The determiner 36 is connected to the input monitor 24 and output monitor 34. In the case that the input level of the signal light to the receiving device 9 is lower than the second input threshold, and the output level of the signal light output from the amplification fiber 11 is lower than the second output threshold, the determining unit 36 does not output instructions to the automatic level controller 33 to change the control method as to the pump LD 27. Thus, the automatic level controller 33 performs automatic level control as to the pump LD 27.

In the case that the input level of the signal light to the receiving device 9 is between the second input threshold and the first input threshold, and the output level of the signal light output from the amplification fiber 11 is in between the second output threshold and the first output threshold, the determining unit 36 outputs instructions to the automatic level controller 33 to modify the control method as to the pump LD 27. Thus, the control method as to the pump LD 27 is changed.

In the case that the input level of the signal light to the receiving device 9 is higher than the first input threshold and the output level of the signal light output from the amplification fiber 11 is higher than the first output threshold, the determiner 36 outputs a stop signal to the pump LD 27. Thus, the supply of pumping light from the pump LD 27 to the amplification fiber 11 is stopped, and the signal light is attenuated by the amplification fiber 11.

The automatic level controller 33 is connected to the PD 32 and determiner 36. Upon receiving instructions from the determiner 36 to change the control method as to the pump LD 27, the automatic level controller 33 changes the control method as to the pump LD 27. For example, the automatic level controller 33 may change the control method as to the pump LD 27 from automatic level control to automatic current control. In automatic current control after a change, the driving current amount of the pump LD 27 may be set to a current amount at or below the driving current amount of when automatic level control is being performed, and the output level of the pumping light output from the pump LD 27 may be a lower level than when automatic level control is being performed.

The pump LD 27 is connected to the input monitor 24, automatic level controller 33, and determiner 36. Upon receiving a stop signal from the input monitor 24, the pump LD 27 stops the driving, and stops the output of pumping light. Upon receiving the stop signal from the determiner 36, the pump LD 27 stops the driving, and stops the output of pumping light.

Figure 11:
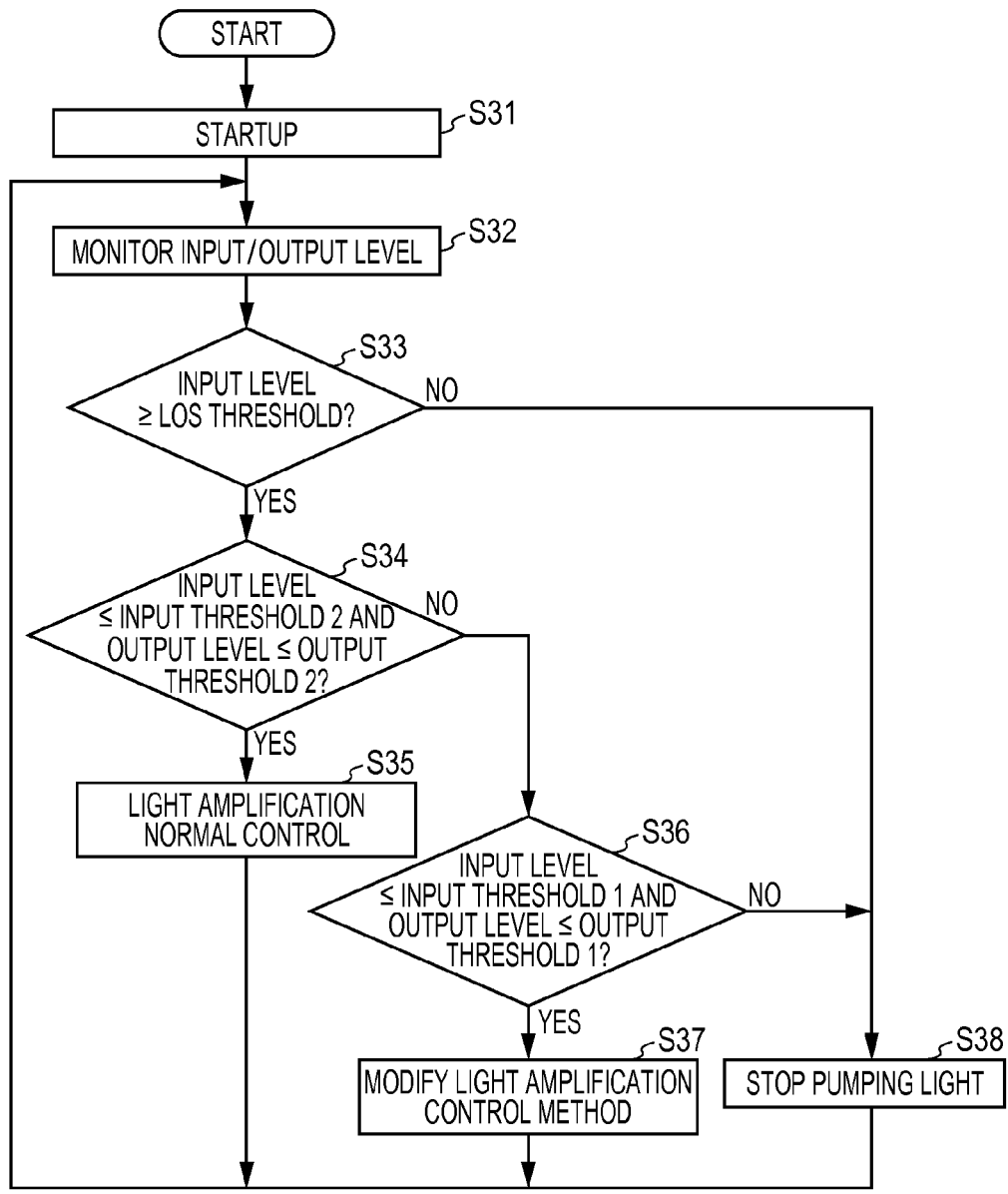
FIG. 11 is a diagram illustrating an example of a receiving method according to the receiving device illustrated in FIG. 10.

FIG. 11 is a diagram illustrating an example of a receiving method by the receiving device illustrated in FIG. 10. Note that in FIG. 11, "first input threshold" is expressed as "input threshold 1", and "second input threshold" is expressed as "input threshold 2". Also, "first output threshold" is expressed as "output threshold 1", and "second output threshold" is expressed as "output threshold 2".

As illustrated in FIG. 11, upon the receiving device 9 being started up (operation S31), the input monitor 24 monitors the input level of the signal light input into the amplification fiber 11. Also, the output monitor 34 monitors the output level of the signal light output from the amplification fiber 11 (operation S32). The input monitor 24 determines whether or not the input level being monitored is at or above the LOS threshold (operation S33).

In the case that the input level is not at or above the LOS threshold (No in operation S33), the input monitor 24 outputs a stop signal to the pump LD 27. Thus, the driving of the pump LD 27 is stopped, and the supply of pumping light from the pump LD 27 to the amplification fiber 11 is stopped (operation S38). Returning to operation S32, the operations S32 through S38 are repeated.

In the case that the input level is at or above the LOS threshold (Yes in operation S33), the input monitor 24 determines whether the input level being monitored is higher or lower than the first input threshold, or higher or lower than the second input threshold. The input monitor 24 outputs the determination results to the determiner 36. Also, the output monitor 34 determines whether the output level to be monitored is higher or lower than the first output threshold, or higher or lower than the second output threshold. The output monitor 34 outputs the determination results to the determiner 36.

In the case that the input level of the signal light to the receiving device 9 is at or below the second input threshold, and the output level of the signal light output from the amplification fiber 11 is at or below the second output threshold (Yes in operation S34), the determiner 36 does not output a stop signal to the pump LD 27. Also, the determiner 36 does not output instructions to the automatic level controller 33 to change the control method as to the pump LD 27.

Thus, the pump LD 27 is driven by a normal method, e.g. by automatic level control, for example. Accordingly, pumping light is supplied from the pump LD 27 to the amplification fiber 11, and signal light is amplified by the amplification fiber 11 (operation S35). Returning to operation S32, the operations S32 through S38 are repeated.

On the other hand, in the case that the input level of the signal light to the receiving device 9 is not below the second input threshold, or the output level of the signal light output from the amplification fiber 11 is not below the second output threshold (No in operation S34), the flow is advanced to operation S36. In the case that the input level of the signal light to the receiving device 9 is at or below the first input threshold, and the output level of the signal light output from the amplification fiber 11 is at or below the first output threshold (Yes in operation S36), the determiner 36 does not output a stop signal to the pump LD 27, and outputs change instructions for the control method to the automatic level controller 33.

Thus, the pump LD 27 is driven by a control method after the change, e.g. automatic current control. Accordingly, pumping light of a low output level is supplied from the pump LD 27 to the amplification fiber 11, and the signal light is amplified by the amplification fiber 11 (operation S37). Returning to the operation S32, the operations S32 through S38 are repeated.

On the other hand, in the case that the input level of the signal light to the receiving device 9 is not at or below the first input threshold, or in the case that the output level of the signal light output from the amplification fiber 11 is not at or below the first output threshold (No in operation S36), the determiner 36 outputs a stop signal to the pump LD 27. Thus, the driving of the pump LD 27 is stopped, and the supply of pumping light from the pump LD 27 to the amplification fiber 11 is stopped (operation S38). Returning to the operation S32, the operations S32 through S38 are repeated.

According to the receiving device 9 illustrated in FIG. 10 and the receiving method illustrated in FIG. 11, the driving of the pump LD 27 and the control method for stopping the driving and driving, are controlled based on the input level of the signal light that is input into the amplification fiber 11 and the output level of the signal light output from the amplification fiber 11. Thus, the signal light is amplified or attenuated by the amplification fiber 11 so as to be contained within the dynamic range of the receiver 15. Accordingly, by not having to provide an optical attenuator, power may be reduced in the amount that would be consumed by an optical attenuator. Also, by not having to temporarily amplify the signal light input into the receiving device 9 to a level exceeding the dynamic range of the receiver 15, the power that would be consumed by driving the pump LD 27 may be reduced.

Also, in the case that the input level of the signal light input into the amplification fiber 11 is somewhat high, for example in a case of being higher than the second input threshold or the case that the output level of the signal light output from the amplification fiber 11 is somewhat high, the control method as to the pump LD 27 is switched to open loop control. Thus, control as to the pump LD 27 becoming difficult may be avoided.

Also, in the case that there are wavelength properties in the amplification properties and absorption properties of the amplification fiber 11, the output level of the signal light output from the amplification fiber 11 differs by wavelength, even if the pumping light power is the same. That is to say, if the wavelengths differ, the pumping light power used to obtain the same gain differs. By monitoring the output level of the signal light, when returning from automatic current control to automatic level control, the signal light of a wavelength having a small gain switches at a point that the input level to the amplification fiber 11 is high, and the signal light of a wavelength having a large gain switches at a point that the input level is low.

Fifth Embodiment

Figure 12:
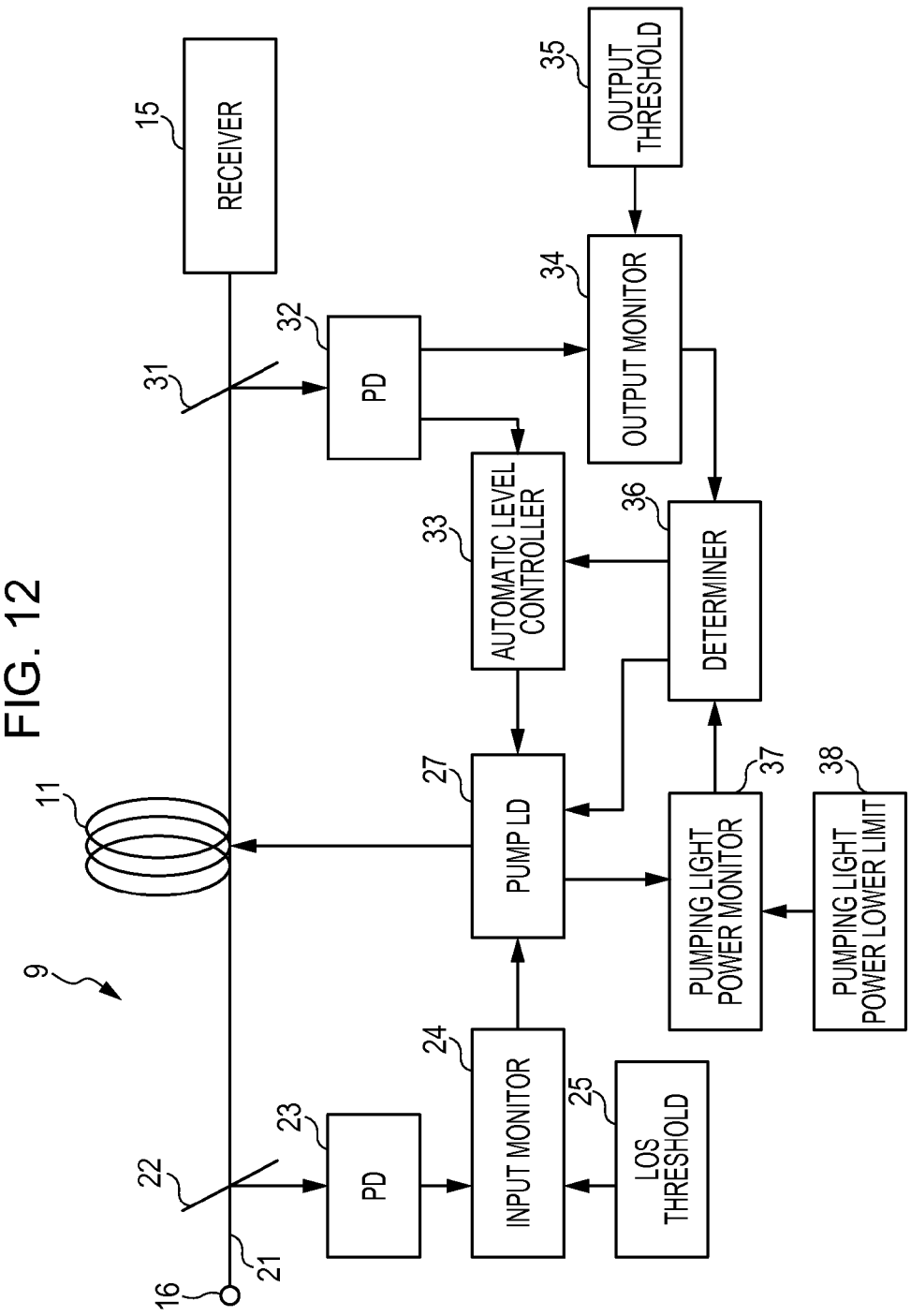
FIG. 12 is a diagram illustrating another example of a receiving device according to an embodiment.

FIG. 12 is a diagram illustrating another example of a receiving device according to an embodiment. As illustrated in FIG. 12, the receiving device 9 may have a pumping light power monitor 37 and a pumping light power lower limit threshold 38, for example. Also, the receiving device 9 may have an optical transmission line 21, optical coupler 22, PD 23, input monitor 24, LOS threshold 25, amplification fiber 11, pump LD 27, receiver 15, optical coupler 31, PD 32, automatic level controller 33, output monitor 34, output threshold 35, and determiner 36.

The PD 23, input monitor 24, PD 32, automatic level controller 33, output monitor 34, determiner 36, and pumping light power monitor 37 are examples of a controller. The optical transmission line 21, optical coupler 22, PD 23, input monitor 24, LOS threshold 25, amplification fiber 11, pump LD 27, receiver 15, optical coupler 31, PD 32, automatic level controller 33, output monitor 34, output threshold 35, and determiner 36 are as described in the description of the receiving device 9 illustrated in FIG. 10. Accordingly, redundant description will be omitted.

The pumping light power monitor 37 is connected to the pump LD 27. The pumping light power monitor 37 monitors output power of the pumping light that is output from the pump LD 27, based on an electrical signal supplied from a monitor PD that is built into the pump LD 27. The output power from the pumping light is an example of a driving parameter of the pumping light source. A pumping light power lower limit threshold 38 is provided to the pumping light power monitor 37. The pumping light power lower limit threshold 38 is an example of a driving threshold. The pumping light power lower limit threshold 38 may be stored in a memory, for example.

Let us say that the pumping light power lower limit threshold 38 has a first pumping light power threshold and a second pumping light power threshold. Let us say that the second pumping light power threshold is greater than the first pumping light power threshold. The first pumping light power threshold is a threshold to stop the amplification of the signal light by the amplification fiber 11. Let us say that the second pumping light power threshold is a threshold to change the control method as to the pump LD 27.

Accordingly, the pumping light power monitor 37 determines whether the output power of the pumping light being monitored is greater or smaller than the first pumping light power threshold. Also, the pumping light power monitor 37 determines whether the output power of the pumping light being monitored is great or smaller than the second pumping light power threshold. The pumping light power monitor 37 outputs the determination results to the determiner 36.

In the case that the input level of the signal light that is input into the amplification fiber 11 is lower than the LOS threshold 25, the input monitor 24 outputs a stop signal to the pump LD 27. Thus, the supply of pumping light from the pump LD 27 to the amplification fiber 11 is stopped, and the amplification of the signal light by the amplification fiber 11 is stopped, whereby properties such as optical amplification properties and proof strength to sudden changes in an optical level may be satisfied.

The determiner 36 is connected to the pumping light power monitor 37 and output monitor 34. In the case that the output level of the signal light output from the amplification fiber 11 is lower than the second output threshold, and the output power of the pumping light is greater than the second pumping light power threshold, the determiner 36 does not output instructions to the automatic level controller 33 to change the control method as to the pump LD 27. Thus, the automatic level controller 33 performs automatic level control as to the pump LD 27.

In the case that the output level of the signal light output from the amplification fiber 11 is lower than the second output threshold, and the output power of the pumping light is between the first pumping light power threshold and the second pumping light power threshold, the determiner 36 outputs instructions to the automatic level controller 33 to change the control method as to the pump LD 27. Thus, the control method as to the pump LD 27 is changed.

Also, in the case that the output level of the signal light output from the amplification fiber 11 is between the second output threshold and the first output threshold, the determiner 36 outputs instructions to the automatic level controller 33 to change the control method as to the pump LD 27. Thus, the control method as to the pump LD 27 is changed.

In the case that the output level of the signal light that is output from the amplification fiber 11 is higher than the first output threshold, the determiner 36 outputs a stop signal to the pump LD 27. Thus, the supply of pumping light from the pump LD 27 to the amplification fiber 11 is stopped, and the signal light is attenuated by the amplification fiber 11.

Also, in the case that the output power of the pumping light is smaller than the first pumping light power threshold, the determiner 36 outputs a stop signal to the pump LD 27. Thus, the supply of pumping light from the pump LD 27 to the amplification fiber 11 is stopped, and the signal light is attenuated by the amplification fiber 11.

Figure 13:
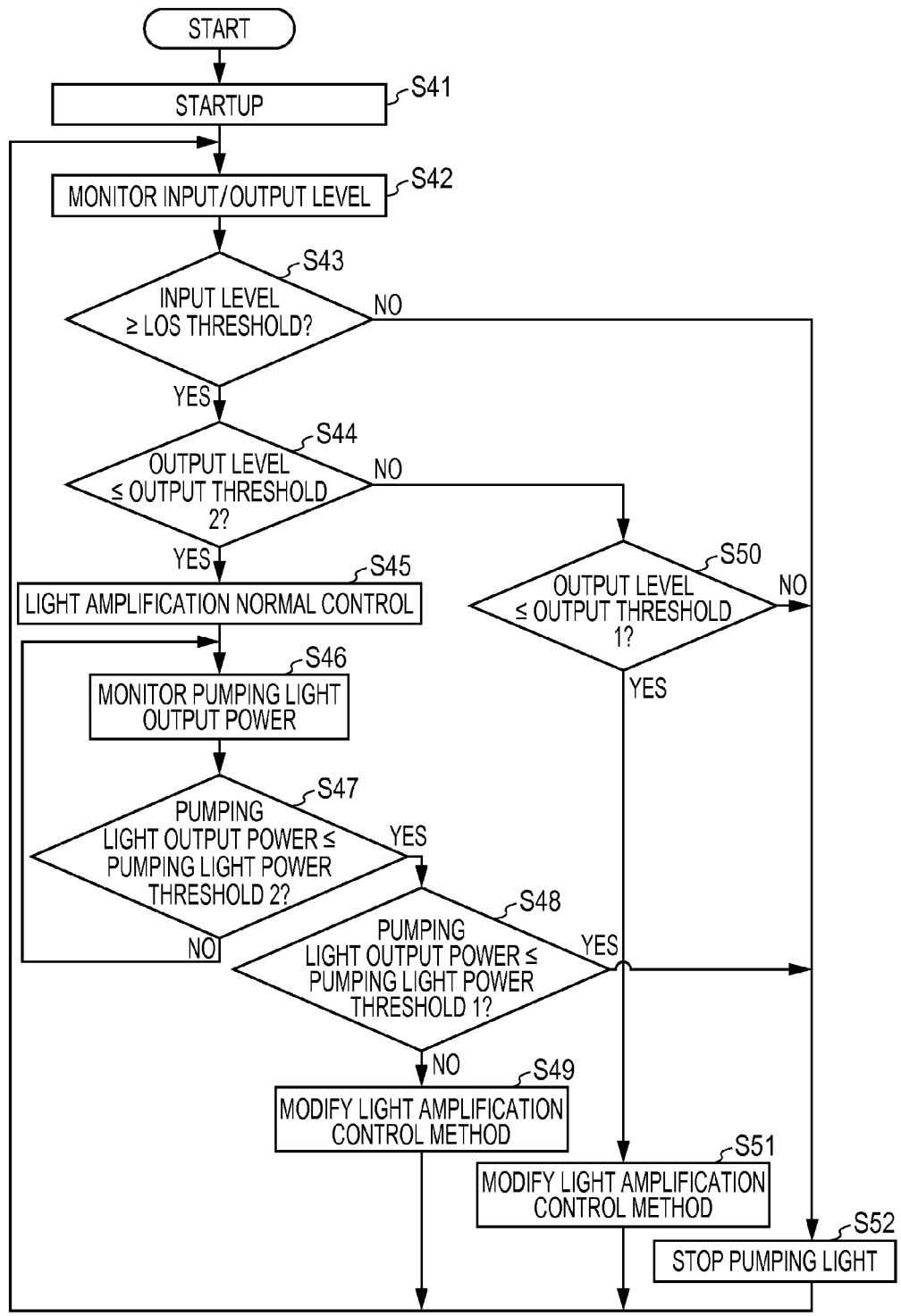
FIG. 13 is a diagram illustrating an example of a receiving method according to the receiving device illustrated in FIG. 12.

FIG. 13 is a diagram illustrating an example of a receiving method by the receiving device illustrated in FIG. 12. Note that in FIG. 13, "first pumping light power threshold" is expressed as "pumping light power threshold 1", and "second pumping light power threshold" is expressed as "pumping light power threshold 2". Also, "first output threshold" is expressed as "output threshold 1", and "second output threshold" is expressed as "output threshold 2".

As illustrated in FIG. 13, upon the receiving device 9 being started up (operation S41), the output monitor 34 monitors the output level of the signal light that is output from the amplification fiber 11 (operation S42). Also, the input monitor 24 monitors the input level of the signal light that is input into the amplification fiber 11. The input monitor 24 determines whether or not the input level being monitored is at or above the LOS threshold (operation S43).

In the case that the input level is not at or above the LOS threshold (No in operation S43), the input monitor 24 outputs a stop signal to the pump LD 27. Thus, the driving of the pump LD 27 is stopped, and the supply of pumping light from the pump LD 27 to the amplification fiber 11 stops (operation S52). Returning to operation S42, the operations S42 through S52 are repeated.

In the case that the input level is at or greater than the LOS threshold (Yes in operation S43), the output monitoring unit 34 determines whether the output level being monitored is higher or lower than the first output threshold, or higher or lower than the second output threshold. The output monitor 34 outputs the determination results to the determining unit 36.

In the case that the output level of the signal light that is output from the amplification fiber 11 is at or below the second output threshold (Yes in operation S44), the determiner 36 does not output a stop signal to the pump LD 27. Also, the determiner 36 does not output instructions to the automatic level controller 33 to change the control method as to the pump LD 27.

Thus, the pump LD 27 is driven by a normal control method, e.g. automatic level control. Accordingly, pumping light is supplied from the pump LD 27 to the amplification fiber 11, and the signal light is amplified by the amplification fiber 11 (operation S45).

Also, the pumping light power monitor 37 monitors the output power of the pumping light that is output from the pump LD 27 (operation S46). The pumping light power monitor 37 determines whether the output power of the pumping light being monitored is higher or lower than the first pumping light power threshold, or higher or lower than the second pumping light power threshold. The pumping light power monitor 37 outputs the determination results to the determiner 36.

In the case that the output power of the pumping light being monitored is not at or below the second pumping light power threshold (No in operation S47), the pumping light power monitor 37 returns to operation S46. The pumping light power monitor 37 then continues monitoring the output power of the pumping light (operation S46) and the comparison and determination of the second pumping light power threshold (operation S47).

As a result of the comparison and determination of the output power of the pumping light and the second pumping light power threshold, if the output power of the pumping light is at or below the second pumping light power threshold (Yes in operation S47), the flow is advanced to operation S48. In the case that the output power of the pumping light is not at or below the first pumping light power threshold (No in operation S48), the determiner 36 does not output a stop signal to the pump LD 27, and outputs instructions to change the control method to the automatic level controller 33.

Thus, the pump LD 27 is driven by a control method after the change, e.g. automatic current control. Accordingly, pumping light of a low output level is supplied from the pump LD 27 to the amplification fiber 11, and the signal light is amplified by the amplification fiber 11 (operation S49). Returning to the operation S42, the operations S42 through S52 are repeated.

In the case that the output power of the pumping light is at or below the first pumping light power threshold (Yes in operation S48), the determiner 36 outputs a stop signal to the pump LD 27. Thus, the driving of the pump LD 27 is stopped, and supply of the pumping light from the pump LD 27 to the amplification fiber 11 is stopped (operation S52). Returning to the operation S42, the operations S42 through S52 are repeated.

On the other hand, in the case that the output level of the signal light output from the amplification fiber 11 is not at or below the second output threshold (No in operation S44), the flow is advanced to operation S50. In the case that the output level of the signal light output from the amplification fiber 11 is at or below the first output threshold (Yes in operation S50), the determiner 36 does not output the stop signal to the pump LD 27, and outputs instructions to change the control method to the automatic level controller 33.

Thus, the pump LD 27 is driven by a control method after the change, e.g. automatic current control. Accordingly, pumping light of a low output level is supplied from the pump LD 27 to the amplification fiber 11, and the signal light is amplified by the amplification fiber 11 (operation S51). Returning to the operation S42, the operations S42 through S52 are repeated.

In the case that the output level of the signal light that is output from the amplification fiber 11 is not at or below the first output threshold (No in operation S50), the determiner 36 outputs a stop signal to the pump LD 27. Thus, the driving of the pump LD 27 is stopped, and the supply of the pumping light from the pump LD 27 to the amplification fiber 11 is stopped (operation S52). Returning to the operation S42, the operations S42 through S52 are repeated.

According to the receiving device 9 illustrated in FIG. 12 and the receiving method illustrated in FIG. 13, the driving of the pump LD 27 and the control method for stopping the driving and driving, are controlled based on the output level of the signal light that is output from the amplification fiber 11 and the output power of the pumping light that is output from the pump LD 27. Thus, the signal light is amplified or attenuated by the amplification fiber 11 so as to be contained within the dynamic range of the receiver 15. Accordingly, by not having to provide an optical attenuator, power may be reduced in the amount that would be consumed by an optical attenuator. Also, by not having to temporarily amplify the signal light input into the receiving device 9 to a level exceeding the dynamic range of the receiver 15, the power that would be consumed by driving the pump LD 27 may be reduced.

Also, in the case that the output level of the signal light that is output from the amplification fiber 11 is somewhat high, or in the case that the output power of the pumping light that is output from the pump LD 27 is somewhat low, the control method as to the pump LD 27 is switched to open loop control. Thus, control as to the pump LD 27 becoming difficult may be avoided. Also, in the case that there are wavelength properties in the amplification properties and absorption properties of the amplification fiber 11, when returning from automatic current control to automatic level control, control may be performed by monitoring the output power of the pumping light, to switch depending on the input level of the signal light according to the wavelength.

Sixth Embodiment

Figure 14:
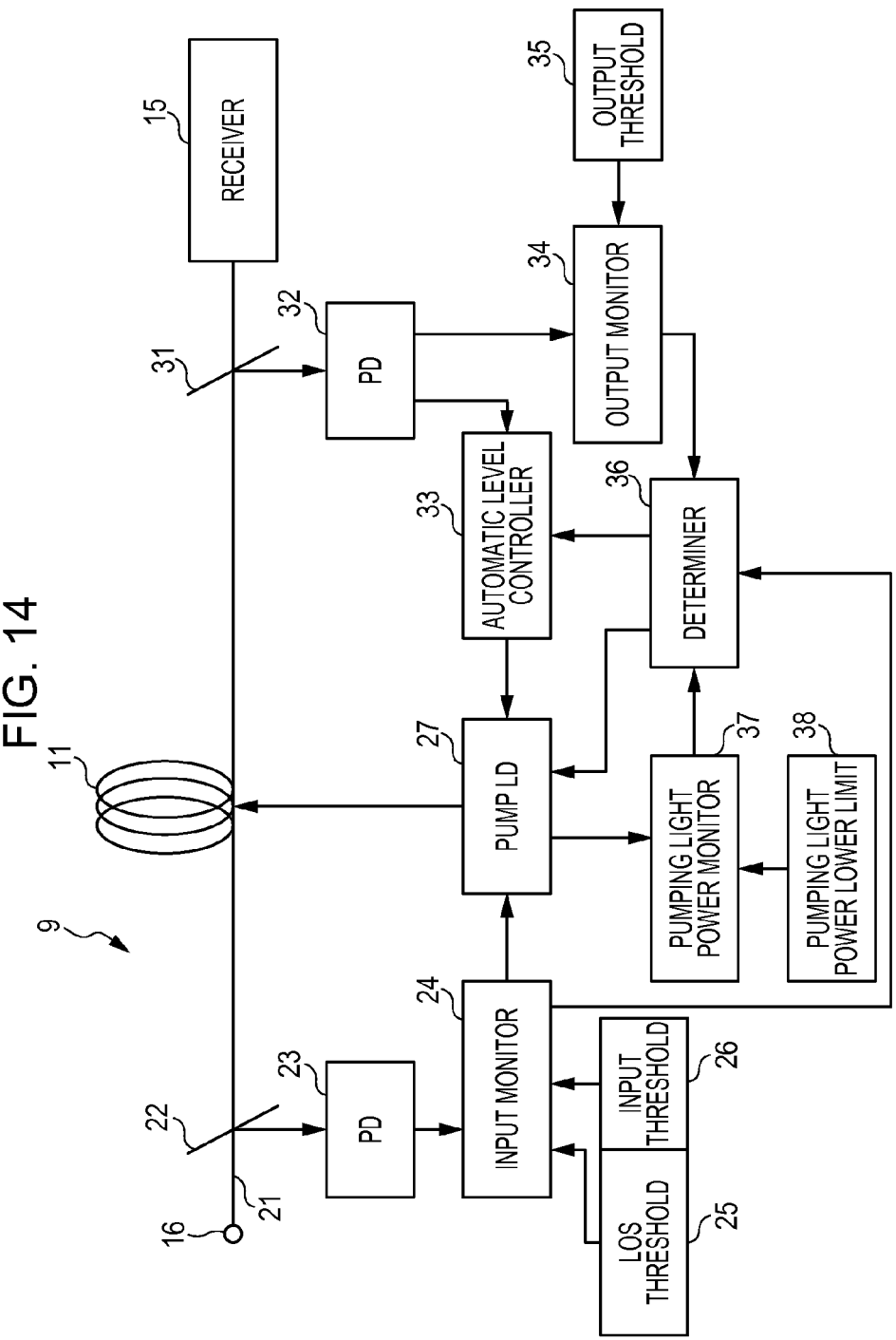
FIG. 14 is a diagram illustrating another example of a receiving device according to an embodiment.

FIG. 14 is a diagram illustrating another example of a receiving device according to an embodiment. As illustrated in FIG. 14, the receiving device 9 may have a pumping light power monitor 37 and a pumping light power lower limit threshold 38, for example. Also, the receiving device 9 may have an optical transmission line 21, optical coupler 22, PD 23, input monitor 24, LOS threshold 25, input threshold 26, amplification fiber 11, pump LD 27, receiver 15, optical coupler 31, PD 32, automatic level controller 33, output monitor 34, output threshold 35, and determiner 36.

The PD 23, input monitor 24, PD 32, automatic controller 33, output monitor 34, determiner 36, and pumping light power monitor 37 are examples of a controller. The pumping light power monitor 37 and pumping light power lower limit threshold 38 are as described in the description of the receiving device 9 illustrated in FIG. 12. Also, the input monitor 24 and input threshold 26 are as described in the description of the receiving device 9 illustrated in FIG. 8. Also, the optical transmission line 21, optical coupler 22, PD 23, LOS threshold 25, amplification fiber 11, pump LD 27, receiver 15, optical coupler 31, PD 32, automatic level controller 33, output monitor 34, output threshold 35, and determiner 36 are as described in the description of the receiving device 9 illustrated in FIG. 12. Accordingly, redundant description will be omitted.

The input monitor 24 monitors the input level of the signal light being input into the amplification fiber 11, based on the electrical signal supplied from the PD 23. The input monitor 24 determines whether the input level being monitored is higher or lower than the first input threshold. Also, the input monitor 24 determines whether the input level being monitored is higher or lower than the second input threshold. The first input threshold and second input threshold are as described in the description of the receiving device 9 illustrated in FIG. 8, so redundant description will be omitted. The input monitor 24 outputs the determination results to the determiner 36.

The determiner 36 is connected to the input monitor 24, pumping light power monitor 37, and output monitor 34. In the case that the output level of the signal light that is output from the amplification fiber 11 is lower than the second output threshold, the input level of the signal light that is input into the amplification fiber 11 is lower than the second input threshold, and the output power of the pumping light is greater than the second pumping light power threshold, the determiner 36 does not output instructions to the automatic level controller 33 to change the control method as to the pump LD 27. Thus, the automatic level controller 33 performs automatic level control as to the pump LD 27.

In the case that the output level of the signal light is lower than the second output threshold, the input level of the signal light is lower than the second input threshold, and the output power of the pumping light is between the first pumping light power threshold and second pumping light threshold, the determiner 36 outputs instructions to the automatic level controller 33 to change the control method as to the pump LD 27. Thus, the control method as to the pump LD 27 is changed.

Also, in the case that the output level of the signal light is between the second output threshold and first output threshold, and the input level of the signal light is between the second input threshold and first input threshold, the determiner 36 outputs instructions to the automatic level controller 33 to change the control method as to the pump LD 27. Thus, the control method as to the pump LD 27 is changed.

In the case that the output level of the signal light is higher than the first output threshold and the input level of the signal light is higher than the first input threshold, the determiner 36 outputs a stop signal to the pump LD 27. Thus, supply of the pumping light from the pump LD 27 to the amplification fiber 11 is stopped, and the signal light is attenuated by the amplification fiber 11.

Also, in the case that the output power of the pumping light is smaller than the first pumping light power threshold, the determiner 36 outputs a stop signal to the pump LD 27. Thus, the supply of pumping light from the pump LD 27 to the amplification fiber 11 is stopped, and the signal light is attenuated by the amplification fiber 11.

Figure 15:
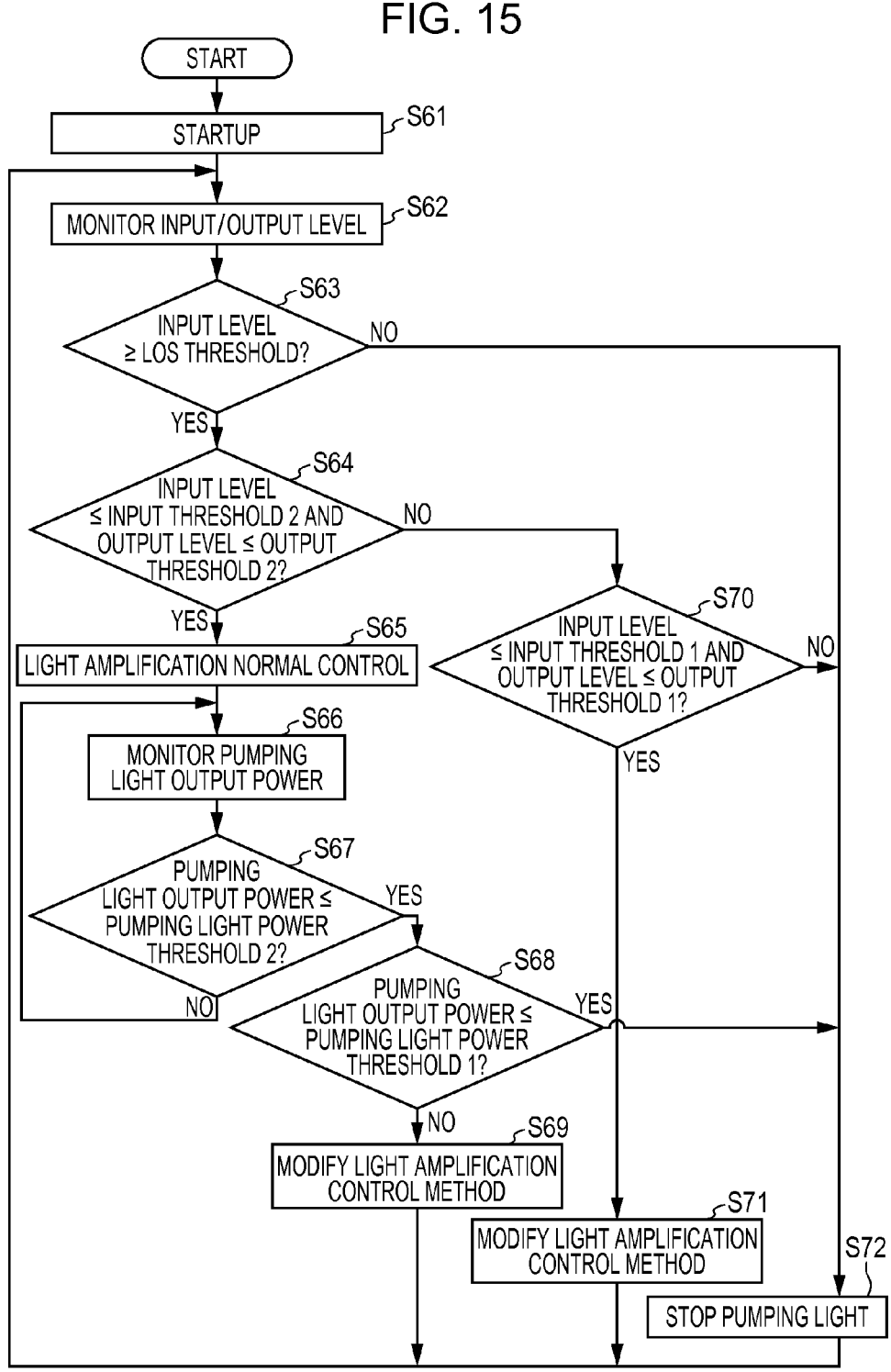
FIG. 15 is a diagram illustrating an example of a receiving method according to the receiving device illustrated in FIG. 14.

FIG. 15 is a diagram illustrating an example of a receiving method by the receiving device illustrated in FIG. 14. Note that in FIG. 15, "first pumping light power threshold" is expressed as "pumping light power threshold 1", and "second pumping light power threshold" is expressed as "pumping light power threshold 2". Also, "first input threshold" is expressed as "input threshold 1", and "second input threshold" is expressed as "input threshold 2". Also, "first output threshold" is expressed as "output threshold 1", and "second output threshold" is expressed as "output threshold 2".

As illustrated in FIG. 15, upon the receiving device 9 being started up (operation S61), the input monitor 24 monitors the input level of the signal light that is input into the amplification fiber 11. The output monitor 34 monitors the output level of the signal light that is output from the amplification fiber 11 (operation S62). The input monitor 24 determines whether or not the input level being monitored is at or above the LOS threshold (operation S63).

In the case that the input level is not at or above the LOS threshold (No in operation S63), the input monitor 24 outputs a stop signal to the pump LD 27. Thus, the driving of the pump LD 27 is stopped, and supply of the pumping light from the pump LD 27 to the amplification fiber 11 is stopped (operation S72). Returning to operation S62, the operations S62 through S72 are repeated.

In the case that the input level is at or above the LOS threshold (Yes in operation S63), the input monitor 24 determines whether the input level being monitored is higher or lower than the first input threshold, or higher or lower than the second input threshold. The input monitor 24 outputs the determination results thereof to the determiner 36. Also, the output monitor 34 determines whether the output level being monitored is higher or lower than the first output threshold, or higher or lower than the second output threshold. The output monitor 34 outputs the determination results thereof to the determiner 36.

In the case that the input level of the signal light to the receiving device 9 is at or below the second input threshold, and the output level of the signal light output from the amplification fiber 11 is at or below the second output threshold (Yes in operation S64), the determiner 36 does not output a stop signal to the pump LD 27. Also, the determiner 36 does not output instructions to the automatic level controller 33 to change the control method as to the pump LD 27.

Thus, the pump LD 27 is driven by a normal control method, e.g. automatic level control. Accordingly, pumping light is supplied from the pump LD 27 to the amplification fiber 11, and the signal light is amplified by the amplification fiber 11 (operation S65).

Also, the pumping light power monitor 37 monitors output power of the pumping light that is output from the pump LD 27 (operation S66). The pumping light power monitor 37 determines whether the output power of the pumping light being monitored is higher or lower than the first pumping light power threshold, or higher or lower than the second pumping light power threshold. The pumping light power monitor 37 outputs the determination results thereof to the determiner 36.

In the case that the output power of the pumping light being monitored is not at or below the second pumping light power threshold (No in operation S67), the pumping light power monitor 37 returns the flow to operation S66. The pumping light power monitor 37 continues monitoring the output power of the pumping light (operation S66) and comparison and determining of the second pumping light power threshold (operation S67).

As a result of the comparison and determination of the output power of the pumping light and the second pumping light power threshold, if the output power of the pumping light is at or below the second pumping light power threshold (Yes in operation S67), the flow is advanced to operation S68. In the case that the output power of the pumping light is not at or below the first pumping light power threshold (No in operation S68), the determiner 36 does not output a stop signal to the pump LD 27, and outputs instructions to the automatic level controller 33 to change the control method.

Thus, the pump LD 27 is driven by a control method after the change, e.g. automatic current control. Accordingly, pumping light of a low output level is supplied from the pump LD 27 to the amplification fiber 11, and the signal light is amplified by the amplification fiber 11 (operation S69). Returning to the operation S62, the operations S62 through S72 are repeated.

In the case that the output power of the pumping light is at or below the first pumping light power threshold (Yes in operation S68), the determiner 36 outputs a stop signal to the pump LD 27. Thus, the driving of the pump LD 27 is stopped, and supply of the pumping light from the pump LD 27 to the amplification fiber 11 is stopped (operation S72). Returning to the operation S62, the operations S62 through S72 are repeated.

On the other hand, in the case that the input level of the signal light to the receiving device 9 is not at or below the second input threshold, or the output level of the signal light that is output from the amplification fiber 11 is not at or below the second output threshold (No in operation S64), the flow is advanced to operation S70. In the case that the input level of the signal light to the receiving device 9 is at or below the first input threshold, and the output level of the signal light that is output from the amplification fiber 11 is at or below the first output threshold (Yes in operation S70), the determiner 36 does not output a stop signal to the pump LD 27, and outputs instructions to the automatic level controller 33 to change the control method.

Thus, the pump LD 27 is driven by a control method after the change, e.g. automatic current control. Accordingly, pumping light of a low output level is supplied from the pump LD 27 to the amplification fiber 11, and the signal light is amplified by the amplification fiber 11 (operation S71). Returning to the operation S62, the operations S62 through S72 are repeated.

In the case that the input level of the signal light to the receiving device 9 is not at or below the first input threshold or the output level of the signal light output from the amplification fiber 11 is not at or below the first output threshold (No in operation S70), the determiner 36 outputs a stop signal to the pump LD 27. Thus, the driving of the pump LD 27 is stopped, and supply of the pumping light from the pump LD 27 to the amplification fiber 11 is stopped (operation S72). Returning to the operation S62, the operations S62 through S72 are repeated.

According to the receiving device 9 illustrated in FIG. 14 and the receiving method illustrated in FIG. 15, the driving of the pump LD 27 and the control method for stopping the driving and driving, are controlled based on the input level of the signal light that is input into the amplification fiber 11, the output level of the signal light output from the amplification fiber 11, and the output power of the pumping light. Thus, the signal light is amplified or attenuated by the amplification fiber 11 so as to be contained within the dynamic range of the receiver 15. Accordingly, by not having to provide an optical attenuator, power may be reduced in the amount that would be consumed by an optical attenuator. Also, by not having to temporarily amplify the signal light input into the receiving device 9 to a level exceeding the dynamic range of the receiver 15, the power that would be consumed by driving the pump LD 27 may be reduced.

Also, in the case that the input level of the signal light input into the amplification fiber 11 is somewhat high, in the case that the output level of the signal light from the amplification fiber 11 is somewhat high, or the case that the output power of the pumping light that is output from the pump LD 27 is somewhat low, the control method as to the pump LD 27 is switched to open loop control. Thus, control as to the pump LD 27 becoming difficult may be avoided.

Seventh Embodiment

Figure 16:
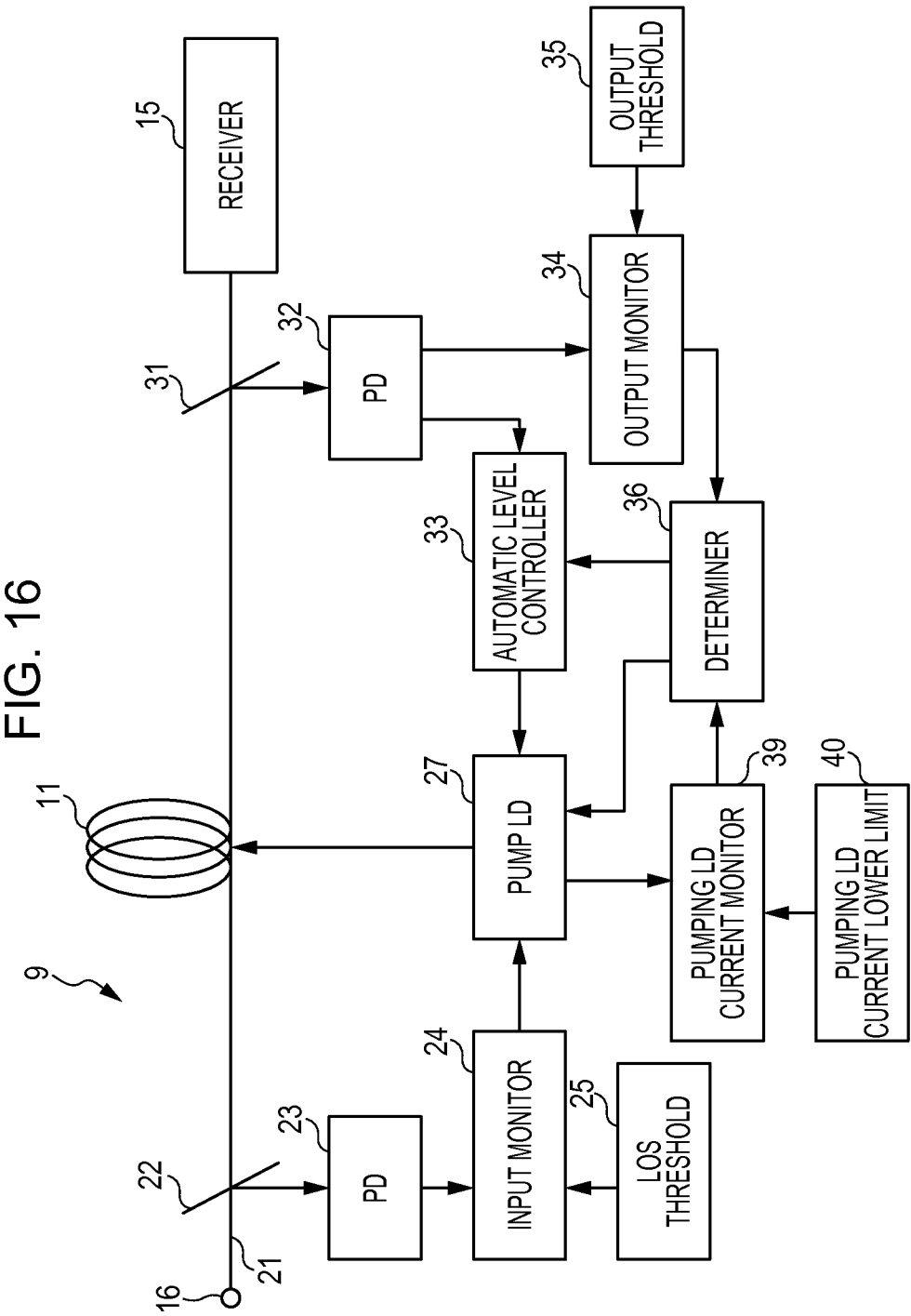
FIG. 16 is a diagram illustrating another example of a receiving device according to an embodiment.

FIG. 16 is a diagram illustrating another example of a receiving device according to an embodiment. As illustrated in FIG. 16, the receiving device 9 may have a pumping LD current monitor 39 and pumping LD current lower limit 40, for example. Also, the receiving device 9 may have an optical transmission line 21, optical coupler 22, PD 23, input monitor 24, LOS threshold 25, amplification fiber 11, pump LD 27, receiver 15, optical coupler 31, PD 32, automatic level controller 33, output monitor 34, output threshold 35, and determiner 36.

The PD 23, input monitor 24, PD 32, automatic level controller 33, output monitor 34, determiner 36, and pumping LD current monitor 39 are examples of a controller. The optical transmission line 21, optical coupler 22, PD 23, input monitor 24, LOS threshold 25, amplification fiber 11, pump LD 27, receiver 15, optical coupler 31, PD 32, automatic level controller 33, output monitor 34, output threshold 35, and determiner 36 are as described in the description of the receiving device 9 illustrated in FIG. 12. Accordingly, redundant description will be omitted.

The pumping LD current monitor 39 is connected to the pump LD 27. The pumping LD current monitor 39 monitors the current driving the pump LD 27, i.e. the pumping LD current. The current that drives the pump LD 27 is an example of a driving parameter of the pumping light source. A pumping LD current lower limit 40 is provided to the pumping LD current monitor 39. The pumping LD current lower limit 40 is an example of a driving threshold. The pumping LD current lower limit 40 may be stored in a memory, for example.

Let us say that the pumping LD current lower limit 40 has a first current threshold and a second current threshold. Let us say that the second current threshold is greater than the first current threshold. The first current threshold is a threshold to stop the amplification of the signal light by the amplification fiber 11. Let us say that the second current threshold is a threshold to change the control method as to the pump LD 27.

Accordingly, the pumping LD current monitor 39 determines whether the pumping LD current being monitored is greater or smaller than the first current threshold. Also, the pumping LD current monitor 39 determines whether the pumping LD current being monitored is greater or smaller than the second current threshold. The pumping LD current monitor 39 outputs the determination results to the determining unit 36.

In the case that the input level of the signal light that is input into the amplification fiber 11 is lower than the LOS threshold 25, the input monitor 24 outputs a stop signal to the pump LD 27. Thus, the supply of pumping light from the pump LD 27 to the amplification fiber 11 is stopped, and the amplification of the signal light by the amplification fiber 11 is stopped, whereby properties such as optical amplification properties and proof strength to sudden changes in an optical level may be satisfied.

The determiner 36 is connected to the pumping LD current monitor 39 and the output monitor 34. In the case that the output level of the signal light that is output from the amplification fiber 11 is lower than the second output threshold and the pumping LD current is greater than the second current threshold, the determiner 36 does not output instructions to the automatic level controller 33 to change the control method as to the pump LD 27. Thus, the automatic level controller 33 performs automatic level control as to the pump LD 27.

In the case that the output level of the signal light that is output from the amplification fiber 11 is lower than the second output threshold, and the pumping LD current is between the first current threshold and second current threshold, the determiner 36 outputs instructions to the automatic level controller 33 to change the control method as to the pump LD 27. Thus, the control method as to the pump LD 27 is changed.

Also, in the case that the output level of the signal light that is output from the amplification fiber 11 is between the second output threshold and first output threshold, the determiner 36 outputs instructions to the automatic level controller 33 to change the control method as to the pump LD 27. Thus, the control method as to the pump LD 27 is changed.

In the case that the output level of the signal light that is output from the amplification fiber 11 is higher than the first output threshold, the determiner 36 outputs a stop signal to the pump LD 27. Thus, the supply of the pumping light from the pump LD 27 to the amplification fiber 11 is stopped, and the signal light is attenuated by the amplification fiber 11.

Also, in the case that the pumping LD current is smaller than the first current threshold, the determiner 36 outputs a stop signal to the pump LD 27. Thus, the supply of the pumping light from the pump LD 27 to the amplification fiber 11 is stopped, and the signal light is attenuated by the amplification fiber 11.

Figure 17:
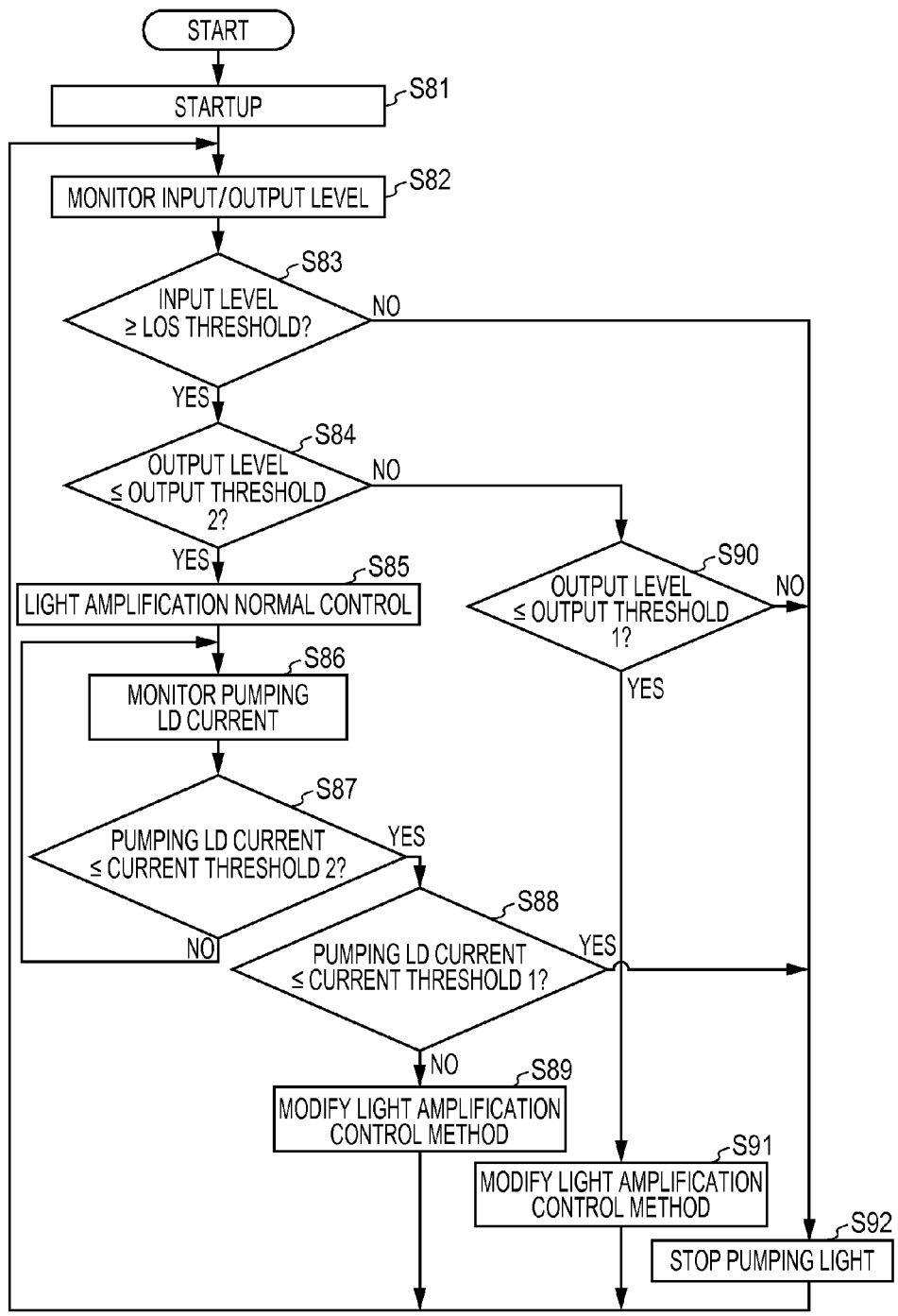
FIG. 17 is a diagram illustrating an example of a receiving method according to the receiving device illustrated in FIG. 16.

FIG. 17 is a diagram illustrating an example of a receiving method by the receiving device illustrated in FIG. 16. Note that in FIG. 17, "first current threshold" is expressed as "current threshold 1", and "second current threshold" is expressed as "current threshold 2". Also, "first output threshold" is expressed as "output threshold 1" and "second output threshold" is expressed as "output threshold 2".

As illustrated in FIG. 17, upon the receiving device 9 being started up (operation S81), the output monitor 34 monitors the output level of the signal light that is output from the amplification fiber 11 (operation S82). Also, the input monitor 24 monitors the input level of the signal light that is input into the amplification fiber 11. The input monitor 24 determines whether or not the input level being monitored is at or above the LOS threshold (operations S83).

In the case that input level is not at or above the LOS threshold (No in operation S83), the input monitor 24 outputs a stop signal to the pump LD 27. Thus, the driving of the pump LD 27 is stopped, and the supply of pumping light from the pump LD 27 to the amplification fiber 11 is stopped (operation S92). Returning to the operation S82, the operations S82 through S92 are repeated.

In the case that the input level is at or above the LOS threshold (Yes in operation S83), the output monitor 34 determines whether the output level being monitored is higher or lower than the first output threshold, or higher or lower than the second output threshold. The output monitor 34 outputs the determination results to the determiner 36.

In the case that the output level of the signal light that is output from the amplification fiber 11 is at or below the second output threshold (Yes in operation S84), the determiner 36 does not output a stop signal to the pump LD 27. Also, the determiner 36 does not output instructions to the automatic level controller 33 to change the control method as to the pump LD 27.

Thus, the pump LD 27 is driven by a normal control method, e.g. automatic level control. Accordingly, pumping light is supplied from the pump LD 27 to the amplification fiber 11, and the signal light is amplified by the amplification fiber 11 (operation S85).

Also, the pumping LD current monitor 39 monitors the pumping LD current output from the pump LD 27 (operation S86). The pumping LD current monitor 39 determines whether the pumping LD current being monitored is higher or lower than the first current threshold, or higher or lower than the second current threshold. The pumping LD current monitor 39 outputs the determination results to the determiner 36.

In the case that the pumping LD current being monitored is not at or below the second current threshold (No in operation S87), the pumping LD current monitor 39 returns the flow to operation S86. The pumping LD current monitor 39 continues monitoring the pumping LD current (operation S86) and the comparison and determination of the second current threshold (operation S87).

As a result of the comparison and determination of the pumping LD current and the second current threshold, if the pumping LD current is at or below the second current threshold (Yes in operation S87), the flow advances to operation S88. If the pumping LD current is not at or below the second current threshold (No in operation S88), the determiner 36 does not output a stop signal to the pump LD 27, and outputs instructions to the automatic level controller 33 to change the control method.

Thus, the pump LD 27 is driven by a control method after the change, e.g. automatic current control. Accordingly, pumping light of a low output level is supplied from the pump LD 27 to the amplification fiber 11, and the signal light is amplified by the amplification fiber 11 (operation S89). Returning to the operation S82, the operations S82 through S92 are repeated.

In the case that the pumping LD current is at or below the first current threshold (Yes in operation S88), the determiner 36 outputs a stop signal to the pump LD 27. Thus, the driving of the pump LD 27 is stopped, and supply of the pumping light from the pump LD 27 to the amplification fiber 11 is stopped (operation S92). Returning to the operation S82, the operations S82 through S92 are repeated.

On the other hand, in the case that the output level of the signal light that is output from the amplification fiber 11 is not at or below a second output threshold (No in operation S84), the flow is advanced to operation S90. In the case that the output level of the signal light that is output from the amplification fiber 11 is at or below the first output threshold (Yes in operation S90), the determiner 36 does not output a stop signal to the pump LD 27, and outputs instructions to the automatic level controller 33 to change the control method.

Thus, the pump LD 27 is driven by a control method after the change, e.g. automatic current control. Accordingly, pumping light of a low output level is supplied from the pump LD 27 to the amplification fiber 11, and the signal light is amplified by the amplification fiber 11 (operation S91). Returning to the operation S82, the operations S82 through S92 are repeated.

In the case that the output level of the signal light that is output from the amplification fiber 11 is not at or below the first output threshold (No in operation S90), the determiner 36 outputs a stop signal to the pump LD 27. Thus, the driving of the pump LD 27 is stopped, and the supply of the pumping light from the pump LD 27 to the amplification fiber 11 is stopped (operation S92). Returning to the operation S82, the operations S82 through S92 are repeated.

According to the receiving device 9 illustrated in FIG. 16 and the receiving method illustrated in FIG. 17, the driving of the pump LD 27 and the control method for stopping the driving and driving, are controlled based on the output level of the signal light that is output from the amplification fiber 11 and current of the pumping LD. Thus, the signal light is amplified or attenuated by the amplification fiber 11 so as to be contained within the dynamic range of the receiver 15. Accordingly, by not having to provide an optical attenuator, power may be reduced in the amount that would be consumed by an optical attenuator. Also, by not having to temporarily amplify the signal light input into the receiving device 9 to a level exceeding the dynamic range of the receiver 15, the power that would be consumed by driving the pump LD 27 may be reduced.

Also, in the case that the output level of the signal light that is output from the amplification fiber 11 is somewhat high or the pumping LD current is somewhat small, the control method as to the pump LD 27 switches to open loop control. Thus, control as to the pump LD 27 becoming difficult may be avoided. Also, in the case that there are wavelength properties in the amplification properties and absorption properties of the amplification fiber 11, when returning from automatic current control to automatic level control, control may be performed by monitoring the pumping LD current, to switch depending on the input level of the signal light according to the wavelength.

Eighth Embodiment

Figure 18:
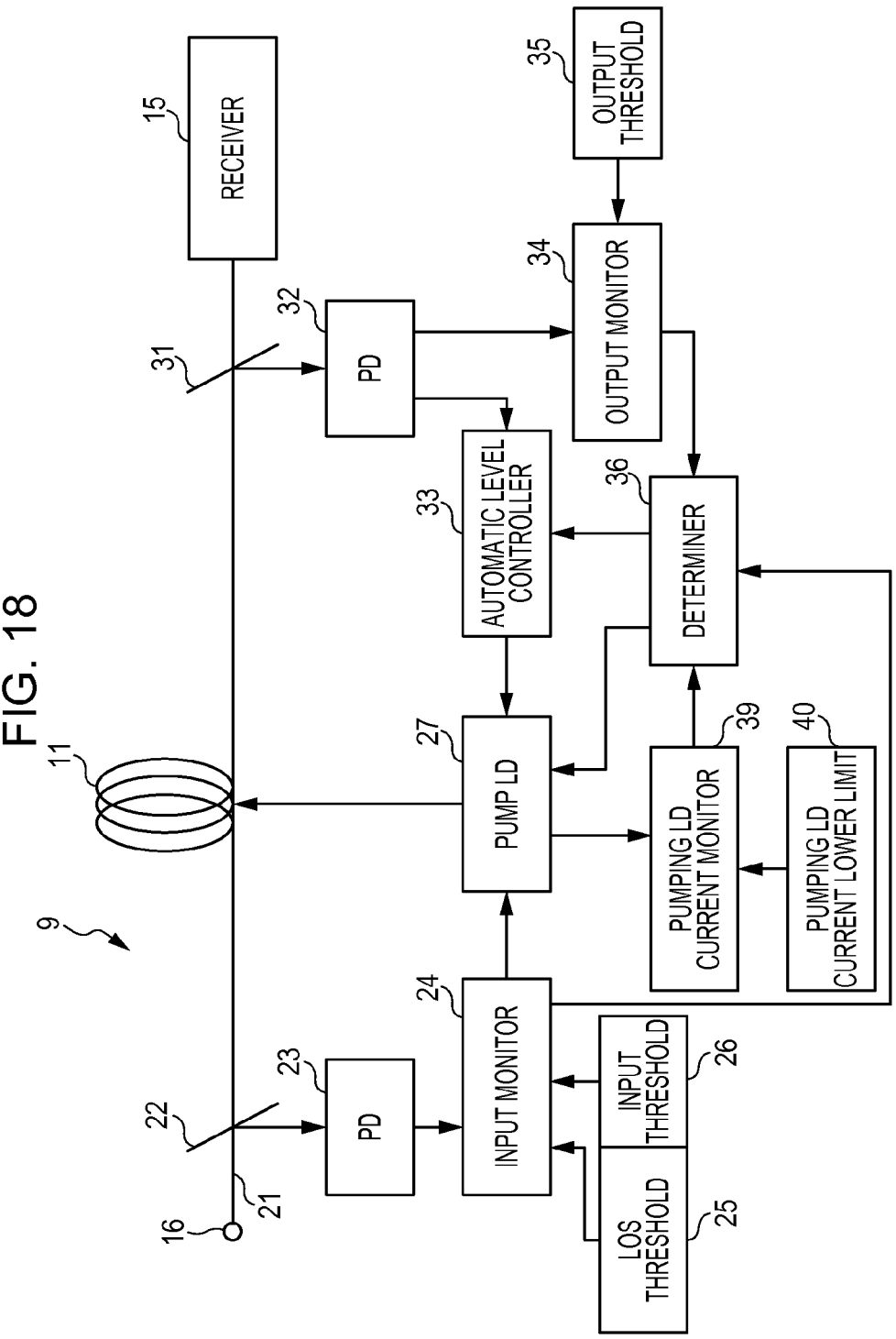
FIG. 18 is a diagram illustrating another example of a receiving device according to an embodiment.

FIG. 18 is a diagram illustrating another example of a receiving device according to an embodiment. As illustrated in FIG. 18, the receiving device 9 may have a pumping LD current monitor 39 and pumping LD current lower limit 40, for example. Also, the receiving device 9 may have an optical transmission line 21, optical coupler 22, PD 23, input monitor 24, LOS threshold 25, input threshold 26, amplification fiber 11, pump LD 27, receiver 15, optical coupler 31, PD 32, automatic level controller 33, output monitor 34, output threshold 35, and determiner 36.

The PD 23, input monitor 24, PD 32, automatic level controller 33, output monitor 34, determiner 36, and pumping LD current monitor 39 are examples of a controller. The pumping LD current monitor 39 and pumping LD current lower limit 40 are as described in the description of the receiving device 9 illustrated in FIG. 16. Also, the input monitor 24 and input threshold 26 are as described in the description of the receiving device 9 illustrated in FIG. 8. Also, the optical transmission line 21, optical coupler 22, PD 23, LOS threshold 25, amplification fiber 11, pump LD 27, receiver 15, optical coupler 31, PD 32, automatic level controller 33, output monitor 34, output threshold 35, and determiner 36 are as described in the description of the receiving device 9 illustrated in FIG. 16. Accordingly, redundant description will be omitted.

The input monitor 24 monitors the input level of the signal light that is input into the amplification fiber 11, based on the electrical signal supplied from the PD 23. The input monitor 24 determines whether the input level being monitored is higher or lower than the first input threshold. Also, the input monitor 24 determines whether the input level being monitored is higher or lower than the second input threshold. The first input threshold and second input threshold are as described in the description of receiving device 9 illustrated in FIG. 8, so redundant description will be omitted. The input monitor 24 outputs the determination results to the determiner 36.

The determiner 36 is connected to the input monitor 24, pumping LD current monitor 39, and the output monitor 34. In the case that the output level of the signal light that is output from the amplification fiber 11 is lower than the second output threshold, the input level of the signal light that is input into the amplification fiber 11 is lower than the second input threshold, and the pumping LD current is greater than the second current threshold, the pumping LD current 27 does not output instructions to the automatic level controller 33 to change the control method as to the determiner 36. Thus, the automatic level controller 33 performs automatic level control as to the pump LD 27.

In the case that the output level of the signal light is lower than the second output threshold, the input level of the signal light is lower than then second input threshold, and the pumping LD current is between the first current threshold and second current threshold, the determiner 36 outputs instructions to the automatic level controller 33 to change the control method as to the pump LD 27. Thus, the control method as to the pump LD 27 is changed.

Also, in the case that the output level of the signal light is between the second output threshold and the first output threshold, and the input level of the signal light is between the second input threshold and the first input threshold, the determiner 36 outputs instructions to the automatic level controller 33 to change the control method as to the pump LD 27. Thus, the control method as to the pump LD 27 is changed.

In the case that the output level of the signal light is higher than the first output threshold and the input level of the signal light is higher than the first input threshold, the determiner 36 outputs a stop signal to the pump LD 27. Thus, the supply of pumping light from the pump LD 27 to the amplification fiber 11 is stopped, and the signal light is attenuated by the amplification fiber 11.

Also, in the case that the pumping LD current is smaller than the first current threshold, the determiner 36 outputs a stop signal to the pump LD 27. Thus, the supply of pumping light from the pump LD 27 to the amplification fiber 11 is stopped, and the signal light is attenuated by the amplification fiber 11.

Figure 19:
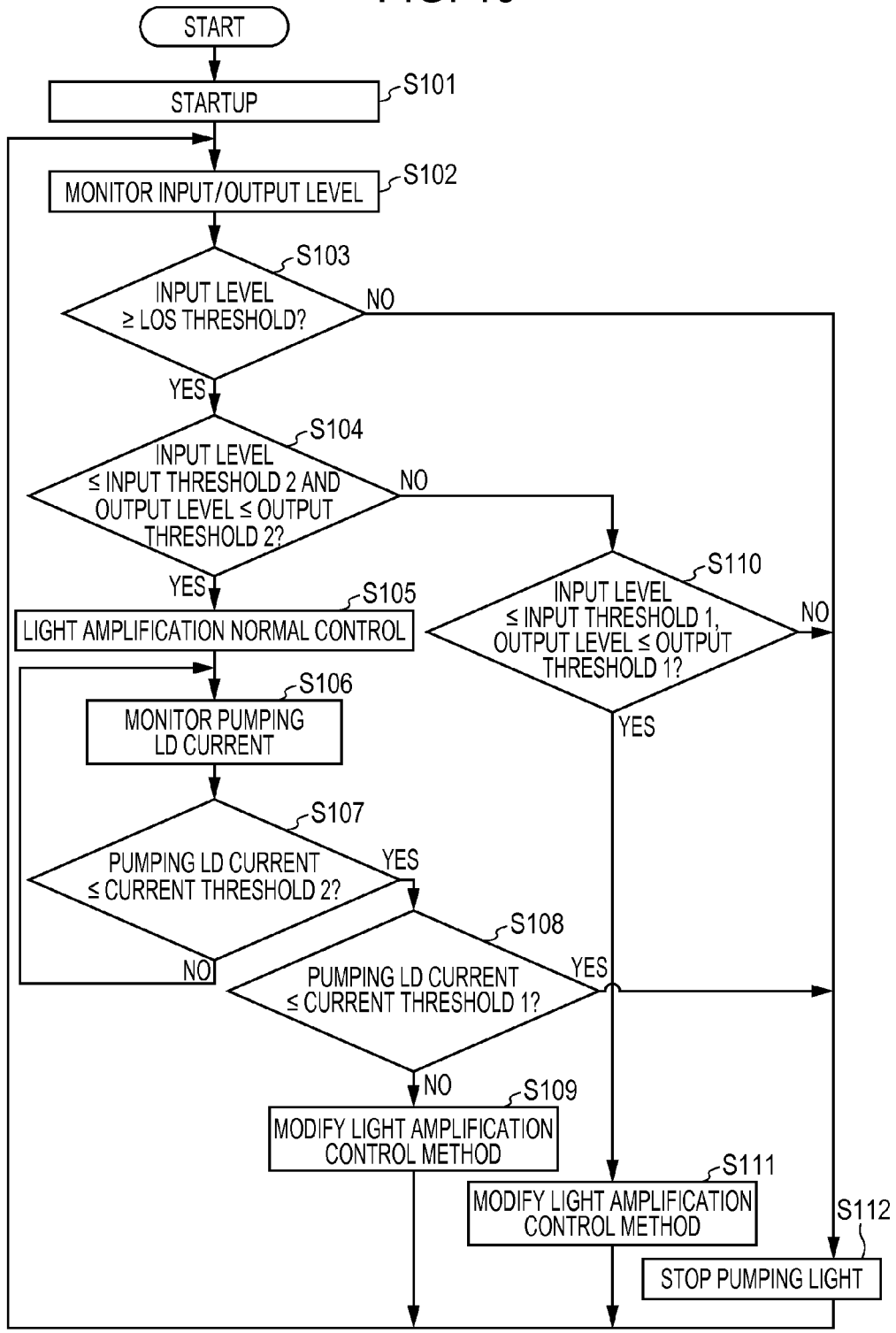
FIG. 19 is a diagram illustrating an example of a receiving method according to the receiving device illustrated in FIG. 18.

FIG. 19 is a diagram illustrating an example of a receiving method by the receiving device illustrated in FIG. 18. Note that in FIG. 19, "first current threshold" is expressed as "current threshold 1", and "second current threshold" is expressed as "current threshold 2". Also, "first input threshold" is expressed as "input threshold 1", and "second input threshold" is expressed as "input threshold 2". Also, "first output threshold" is expressed as "output threshold 1", and "second output threshold" is expressed as "output threshold 2".

As illustrated in FIG. 19, upon the receiving device 9 being started up (operation S101), the input monitor 24 monitors the input level of the signal light that is input into the amplification fiber 11. The output monitor 34 monitors the output level of the signal light that is output from the amplification fiber 11 (operation S102). The input monitor 24 then determines whether or not the input level being monitored is at or above the LOS threshold (operation S103).

In the case that the input level is not at or above the LOS threshold (No in operation S103), the input monitor 24 outputs a stop signal to the pump LD 27. Thus, the driving of the pump LD 27 stops, and the supply of pumping light from the pump LD 27 to the amplification fiber 11 is stopped (operation S112). Returning to the operation S102, the operations S102 through S112 are repeated.

In the case that the input level is at or above the LOS threshold (Yes in operation S103), the input monitor 24 determines whether the input level being monitored is higher or lower than the first input threshold, or higher or lower than the second input threshold. The input monitor 24 outputs the determination results thereof to the determiner 36. Also, the output monitor 34 determines whether the output level being monitored is higher or lower than the first output threshold, or higher or lower than the second output threshold. The output monitor 34 outputs the determination results to the determiner 36.

In the case that the input level of the signal light to the receiving device 9 is at or below the second input threshold, and the output level of the signal light that is output from the amplification fiber 11 is at or below the second output threshold (Yes in operation S104), the determiner 36 does not output a stop signal to the pump LD 27. Also, the determiner 36 does not output instructions to the automatic level controller 33 to change the control method as to the pump LD 27.

Thus, the pump LD 27 is driven by a normal control method, e.g. automatic level control. Accordingly, the pumping light is supplied from the pump LD 27 to the amplification fiber 11, and the signal light is amplified by the amplification fiber 11 (operation S105).

Also, the pumping LD current monitor 39 monitors the pumping LD current output from the pump LD 27 (operation S106). The pumping LD current monitor 39 determines whether the pumping LD current being monitored is higher or lower than the first current threshold, or higher or lower than the second current threshold. The pumping LD current monitor 39 outputs the determination results to the determiner 36.

In the case that the pumping LD current being monitored is not at or below the second current threshold (No in operation S107), the pumping LD current monitor 39 returns the flow to operation S106. The pumping LD current monitor 39 continues monitoring the pumping LD current (operation S106) and the comparison and determination of the second current threshold (operation S107).

As a result of the comparison and determination of the pumping LD current and second current threshold, if the pumping LD current is at or below the second current threshold (Yes in operation S107), the flow is advanced to operation S108. In the case that the pumping LD current is not at or below the first current threshold (No in operation S108), the determiner 36 does not output a stop signal to the pump LD 27, and outputs instructions to the automatic level controller 33 for a control method change.

Thus, the pump LD 27 is driven by a control method after the change, e.g. automatic current control. Accordingly, pumping light of a low output level is supplied from the pump LD 27 to the amplification fiber 11, and the signal light is amplified by the amplification fiber 11 (operation S109). Returning to the operation S102, the operations S102 through S112 are repeated.

In the case that the pumping LD current is at or below the first current threshold (Yes in operation S108), the determiner 36 outputs a stop signal to the pump LD 27. Thus, the driving of the pump LD 27 is stopped, and the supply of the pumping light from the pump LD 27 to the amplification fiber 11 is stopped (operation S112). Returning to the operation S102, the operations S102 through S112 are repeated.

On the other hand, in the case that the input level of the signal light of the receiving device 9 is not at or below the second input threshold, or the output level of the signal light that is output from the amplification fiber 11 is not at or below the second output threshold (No in operation S104), the flow is advanced to operation S110. In the case that the input level of the signal light to the receiving device 9 is at or below the first input threshold, and the output level of the signal light output from the amplification fiber 11 is at or below the first output threshold (Yes in operation S110), the determiner 36 does not output the stop signal to the pump LD 27, and outputs instructions to the automatic level controller 33 for a change to the control method.

Thus, the pump LD 27 is driven by a control method after the change, e.g. automatic current control. Accordingly, pumping light of a low output level is supplied from the pump LD 27 to the amplification fiber 11, and the signal light is amplified by the amplification fiber 11 (operation S111). Returning to the operation S102, the operations S102 through S112 are repeated.

In the case that the input level of the signal light to the receiving device 9 is not at or below the first input threshold, or the output level of the signal light that is output from the amplification fiber 11 is not at or below the first output threshold (No in operation 5110), the determiner 36 outputs a stop signal to the pump LD 27. Thus, the driving of the pump LD 27 is stopped, and the supply of the pumping light from the pump LD 27 to the amplification fiber 11 is stopped (operation S112). Returning to the operation S102, the operations S102 through S112 are repeated.

According to the receiving device 9 illustrated in FIG. 18 and the receiving method illustrated in FIG. 19, the driving of the pump LD 27 and the control method for stopping the driving and driving, are controlled based on the input level of the signal light to the amplification fiber 11, the output level of the signal light from the amplification fiber 11, and the pumping LD current. Thus, the signal light is amplified or attenuated by the amplification fiber 11 so as to be contained within the dynamic range of the receiver 15. Accordingly, by not having to provide an optical attenuator, power may be reduced in the amount that would be consumed by an optical attenuator. Also, by not having to temporarily amplify the signal light input into the receiving device 9 to a level exceeding the dynamic range of the receiver 15, the power that would be consumed by driving the pump LD 27 may be reduced.

Also, in the case that the input level of the signal light to the amplification fiber 11 is somewhat high, the output level of the signal light from the amplification fiber 11 is somewhat high, or the pumping LD current output from the pump LD 27 is somewhat low, the control method as to the pump LD 27 switches to open loop control. Thus, control as to the pump LD 27 becoming difficult may be avoided.

Ninth Embodiment

Figure 20:
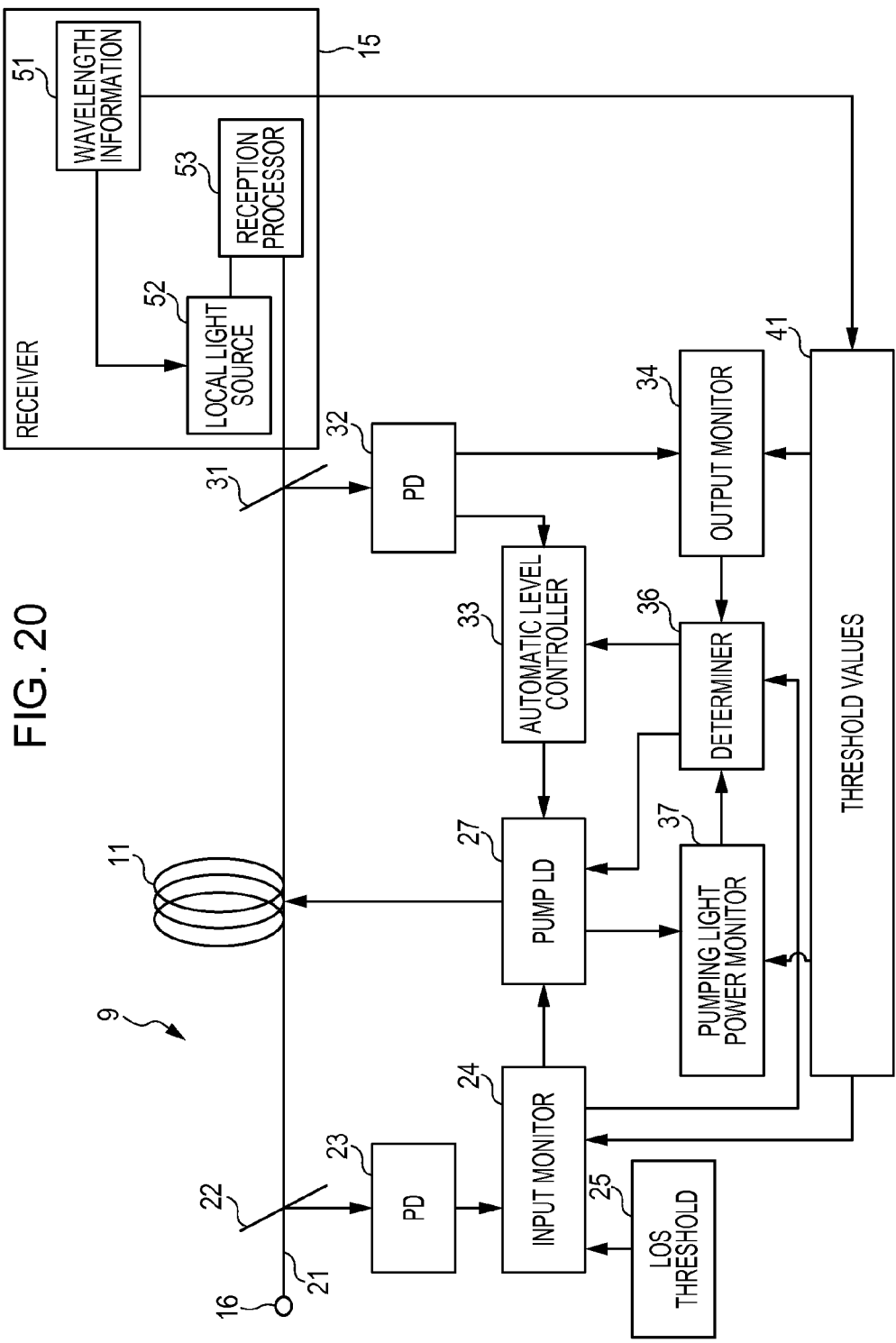
FIG. 20 is a diagram illustrating another example of a receiving device according to an embodiment.

FIG. 20 is a diagram illustrating another example of a receiving device according to an embodiment. As illustrated in FIG. 20, the receiving device 9 may have a receiver 15 that receives signal light using wavelength information. A digital coherent receiver is an example of the receiver 15 that receives the signal light using wavelength information.

The receiver 15 has wavelength information 51 which is information relating to the wavelength of the signal light received by the receiver 15. The receiver 15 outputs local light having the same wavelength as the signal light from the local light source 52, based on the wavelength information 51, and causing the signal light and local light to interfere with one another, performs the receiving processing with the reception processor 53.

The receiving device 9 may have parameter threshold values 41. Also, the receiving device 9 may have an optical transmission line 21, optical coupler 22, PD 23, input monitor 24, LOS threshold 25, amplification fiber 11, pump LD 27, optical coupler 31, PD 32, automatic level controller 33, output monitor 34, determiner 36, and pumping light power monitor 37.

The PD 23, input monitor 24, PD 32, automatic level controller 33, output monitor 34, determiner 36, and pumping light power monitor 37 are examples of a controller. The optical transmission line 21, optical coupler 22, PD 23, input monitor 24, LOS threshold 25, amplification fiber 11, pump LD 27, optical coupler 31, PD 32, automatic level controller 33, output monitor 34, determiner 36, and pumping light power monitor 37 are as described in the description of the receiving device 9 illustrated in FIG. 14. Accordingly, redundant description will be omitted.

The parameter threshold values 41 have a first input threshold, second input threshold, first output threshold, second output threshold, first pumping light power threshold, and second pumping light power threshold, for example, that correspond to various wavelengths. Based on the wavelength information 51, the first input threshold, second input threshold, first output threshold, second output threshold, first pumping light power threshold, and second pumping light power threshold, for example, that correspond to the wavelengths of the signal light, are set in the parameter threshold values 41. Each threshold may be stored in memory, for example, or may have a fixed value set in hardware or software.

The input monitor 24, output monitor 34, and pumping light power monitor 37 are connected to the parameter threshold values 41. The input monitor 24 may have a first input threshold and second input threshold provided thereto from the parameter threshold values 41. The output monitor 34 may have a first output threshold and second output threshold provided thereto from the parameter threshold values 41. The pumping light power monitor 37 may have a first pumping light power threshold and second pumping light power threshold provided thereto from the parameter threshold values 41.

Figure 21:
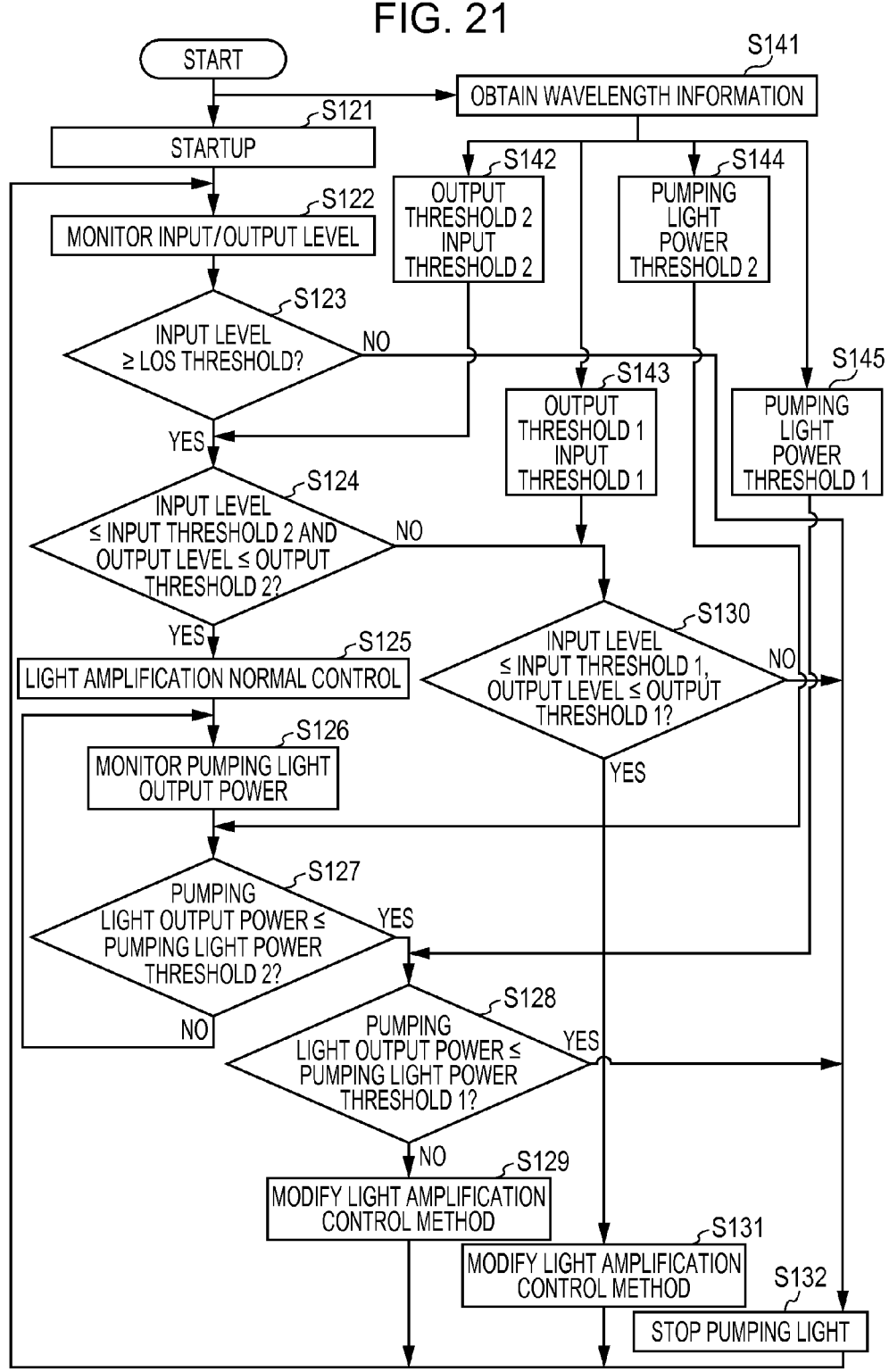
FIG. 21 is a diagram illustrating an example of a receiving method according to the receiving device illustrated in FIG. 20.

FIG. 21 is a diagram illustrating an example of a receiving method of the receiving device illustrated in FIG. 20. Note that in FIG. 21, "first pumping light power threshold" is expressed as "pumping light power threshold 1", and "second pumping light power threshold" is expressed as "pumping light power threshold 2". Also, "first input threshold" is expressed as "input threshold 1", and "second input threshold" is expressed as "input threshold 2". Also, "first output threshold" is expressed as "output threshold 1", and "second output threshold" is expressed as "output threshold 2".

As illustrated in FIG. 21, upon the receiving device 9 being started up (operation S121), the input monitor 24 monitors the input level of the signal light that is input into the amplification fiber 11. The output monitor 34 monitors the output level of the signal light that is output from the amplification fiber 11 (operation S122). The input monitor 24 determines whether or not the input level being monitored is at or above the input threshold (operation S123).

In the case that the input level is not at or above the LOS threshold (No in operation S123), the input monitor 24 outputs a stop signal to the pump LD 27. Thus, the driving of the pump LD 27 is stopped, and the supply of the pumping light from the pump LD 27 to the amplification fiber 11 is stopped (operation S132). Returning to the operation S122, the operations S122 through S132 are repeated.

Also, at the time of startup of the receiving device 9, the receiving device 9 obtains the wavelength information 51 (operation S141). Based on the wavelength information 51, a first input threshold, second input threshold, first output threshold, second output threshold, first pumping light power threshold, and second pumping light power threshold, for example, that correspond to the wavelengths of the signal lights, are set in the parameter threshold values 41 (operations S142 through S145).

In the case that the input level is at or above the LOS threshold (Yes in operation S123, the input monitor 24 determines whether the input level being monitored is higher or lower than the first input threshold, or higher or lower than the second input threshold. The input monitor 24 outputs the determination results thereof to the determiner 36. Also, the output monitor 34 determines whether the output level being monitored is higher or lower than the first output threshold, or higher or lower than the second output threshold. The output monitor 34 outputs the determination results thereof to the determiner 36.

In the case that the input level of the signal light of the receiving device 9 is at or below the second input threshold, and the output level of the signal light that is output from the amplification fiber 11 is at or below the second output threshold (Yes in operation S124), the determiner 36 does not output a stop signal to the pump LD 27. Also, the determiner 36 does not output instructions to the automatic level controller 33 to change the control method as to the pump LD 27.

Thus, the pump LD 27 is driven by a normal control method, e.g. automatic level control. Accordingly, pumping light is supplied from the pump LD 27 to the amplification fiber 11, and the signal light is amplified by the amplification fiber 11 (operation S125).

Also, the pumping light power monitor 37 monitors the pumping light output power that is output from the pump LD 27 (operation S126). The pumping light power monitor 37 determines whether the pumping light output power being monitored is higher or lower than the first pumping light power threshold, or higher or lower than the second pumping light power threshold. The pumping light power monitor 37 outputs the determination results thereof to the determination unit 36.

In the case that the pumping light output power being monitored is not at or below the second pumping light power threshold (No in operation S127), the pumping light power monitor 37 returns the flow to operation S126. The pumping light power monitor 37 continues monitoring the pumping light output power (operation S126) and the comparison and determination of the second pumping light power threshold (operation S127).

As a result of the comparison and determination of the pumping light output power and second pumping light power threshold, if the pumping light output power is at or below the second pumping light power threshold (Yes in operation S127), the flow is advanced to operation S128). In the case that the pumping light output power is not at or below the first pumping light power threshold (No in operation S128), the determiner 36 does not output a stop signal to the pump LD 27, and outputs instructions to the automatic level controller 33 to change the control method.

Thus, the pump LD 27 is driven by a control method after the change, e.g. automatic current control. Accordingly, pumping light of a low output level is supplied from the pump LD 27 to the amplification fiber 11, and the signal light is amplified by the amplification fiber 11 (operation S129). Returning to the operation S122, the operations S122 through S132 are repeated.

In the case that the output power of the pumping light is at or below the first pumping light power threshold (Yes in operation S128), the determiner 36 outputs a stop signal to the pump LD 27. Thus, the driving of the pump LD 27 is stopped, and the supply of the pumping light from the pump LD 27 to the amplification fiber 11 is stopped (operation S132). Returning to the operation S122, the operations S122 through S132 are repeated.

On the other hand, in the case that the input level of the signal light to the receiving device 9 is not at or below the second input threshold, or the output level of the signal light that is output from the amplification fiber 11 is not at or below the second output threshold (No in operation S124), the flow is advanced to operation S130. In the case that the input level of the signal light to the receiving device 9 is at or below the first input threshold, and the output level of the signal light that is output from the amplification fiber 11 is at or below the first output threshold (Yes in operation S130), the determiner 36 does not output a stop signal to the pump LD 27, and outputs instructions to the automatic level controller 33 to change the control method.

Thus, the pump LD 27 is driven by a control method after the change, e.g. automatic current control. Accordingly, pumping light of a low output level is supplied from the pump LD 27 to the amplification fiber 11, and the signal light is amplified by the amplification fiber 11 (operation S131). Returning to the operation S122, the operations S122 through S132 are repeated.

In the case that the input level of the signal light to the receiving device 9 is not at or below the first input threshold, or the output level of the signal light that is output from the amplification fiber 11 is not at or below the first output threshold (No in operation S130), the determiner 36 outputs a stop signal to the pump LD 27. Thus, the driving of the pump LD 27 is stopped, and the supply of the pumping light from the pump LD 27 to the amplification fiber 11 is stopped (operation S132). Returning to the operation S122, the operations S122 through S132 are repeated.

According to the receiving device 9 illustrated in FIG. 20 and the receiving method illustrated in FIG. 21, threshold values, which correspond to the wavelength of the signal light, from a set of threshold values corresponding to various types of wavelengths, are set in the parameter threshold values 41. Thus, amplification by the amplification fiber 11 may be stopped, using levels that differ by wavelength. Also, the control method of the amplification by the amplification fiber 11 may be changed, using levels that differ by wavelength. Note that the receiver 15 is not limited to a digital coherent receiver, and any type of receiver may be used as long as the receiver may output signal light wavelength information.

Tenth Embodiment

Figure 22:
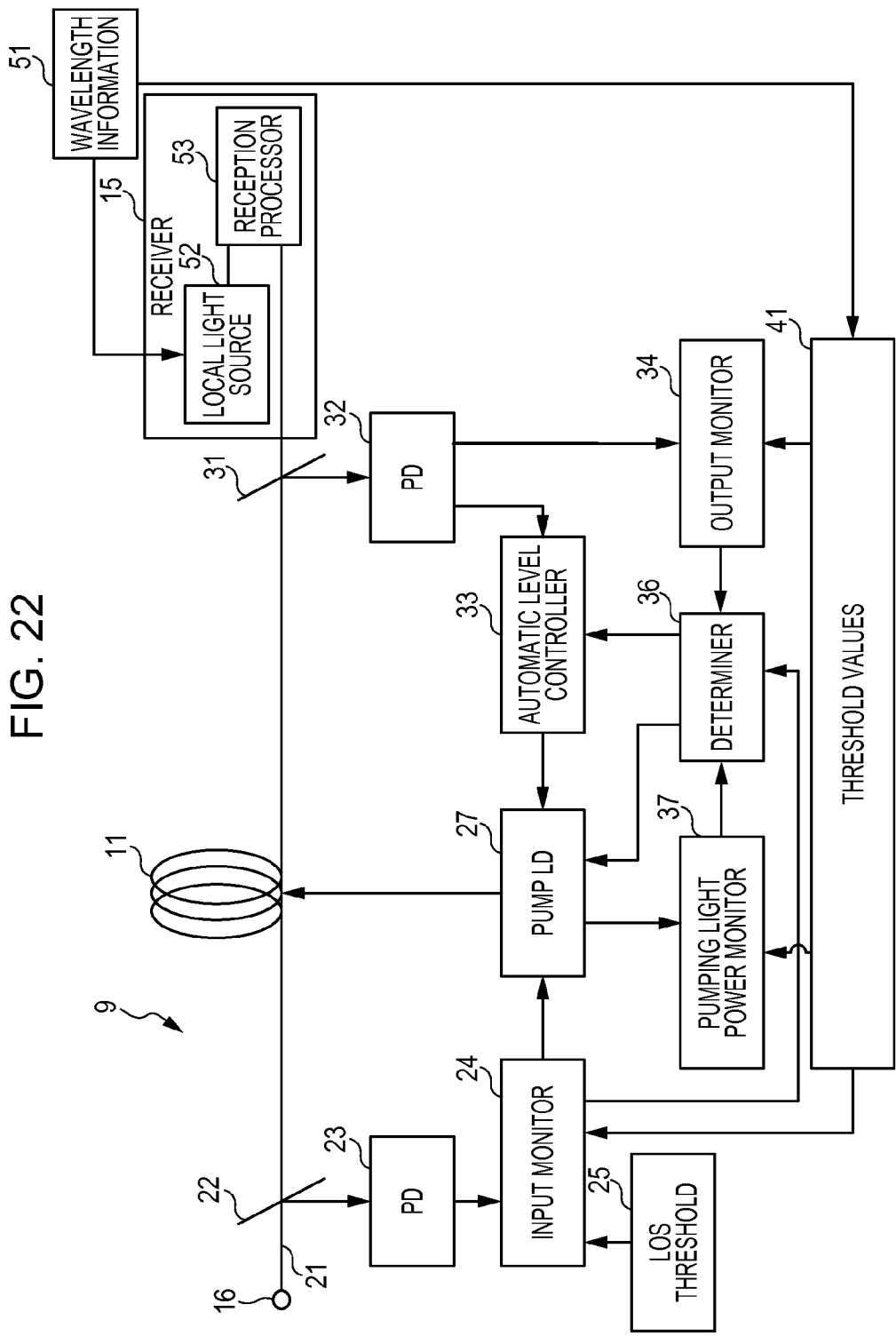
FIG. 22 is a diagram illustrating another example of a receiving device according to an embodiment.

FIG. 22 is a diagram illustrating another example of a receiving device according to an embodiment. As illustrated in FIG. 22, the receiving device 9 may have a receiver 15 that receives signal light using wavelength information set by the user. A digital coherent receiver may receive signal light using wavelength information set by the user.

The receiver 15 outputs local light having the same wavelength as the signal light from the local light source 52, based on the wavelength information 51 set by the user, and performs receiving processing, causing the signal light and local light to interfere with one another, with the reception processor 53.

The receiving device 9 may have parameter threshold values 41. Also, the receiving device 9 may have an optical transmission line 21, optical coupler 22, PD 23, input monitor 24, LOS threshold 25, amplification fiber 11, pump LD 27, optical coupler 31, PD 32, automatic level controller 33, output monitor 34, determiner 36, and pumping light power monitor 37.

The PD 23, input monitor 24, PD 32, automatic level controller 33, output monitor 34, determiner 36, and pumping light power monitor 37 are examples of a controller. The optical transmission line 21, optical coupler 22, PD 23, input monitor 24, LOS threshold 25, amplification fiber 11, pump LD 27, optical coupler 31, PD 32, automatic level controller 33, output monitor 34, determiner 36, pumping light power monitor 37, and parameter threshold values 41 are as described in the description of the receiving device 9 illustrated in FIG. 20. Accordingly, redundant description will be omitted.

An example of the receiving method by the receiving device illustrated in FIG. 22 is similar to the receiving method illustrated in FIG. 21. Accordingly, redundant description will be omitted.

According to the receiving device 9 illustrated in FIG. 22, threshold values, which correspond to the wavelength information 51, which is set by the user from a set of threshold values corresponding to various types of wavelengths, are set in the parameter threshold values 41. Thus, amplification by the amplification fiber 11 may be stopped, using levels that differ by wavelength. Also, the control method of the amplification by the amplification fiber 11 may be changed, using levels that differ by wavelength. Note that the receiver 15 is not limited to a digital coherent receiver, and any type of receiver may be used as long as the receiver may output signal light wavelength information.

Note that the driving of the pump LD 27 and the control method of stopping driving and driving may be controlled based on a combination of the input level of the signal light to the receiving device 9 and the pumping light output power. Also, the driving of the pump LD 27 and the control method of stopping driving and driving may be controlled based on a combination of the input level of the signal light to the receiving device 9 and the pumping LD current. Also, in the above described embodiments, the control method as to the pump LD 27 may be switched from an automatic gain control (AGC) to automatic level control, and may be switched from automatic gain control to automatic current control. That is to say, a variety of combinations may be used as the combination of control methods as to the pump LD 27.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiving device, comprising:
an amplification fiber configured to include properties to amplify signal light when pumping light is supplied to the amplification fiber and to attenuate the signal light when the pumping light is not supplied to the amplification fiber;

a receiver configured to receive the signal light output from the amplification fiber;
a pumping light source configured to supply the pumping light to the amplification fiber; and
a controller configured to control supplying of the pumping light from the pumping light source to the amplification fiber such that the amplification fiber amplifies the signal light when the pumping light is supplied and control stopping of the pumping light from the pumping light source to the amplification fiber such that the amplification fiber attenuates the signal light when the pumping light is not supplied, so that a level of the signal light input to the receiver is contained within a dynamic range of the receiver.

2. The receiving device according to claim 1, wherein the controller stops supplying of the pumping light in a case that the level of the signal light input into the amplification fiber is higher than a first input threshold, or the level of the signal light output from the amplification fiber is higher than a first output threshold, or a driving parameter of the pumping light source is smaller than a first driving threshold.

3. The receiving device according to claim 1, wherein the controller stops supplying of the pumping light in a case that the level of the signal light input into the amplification fiber is higher than the first input threshold, and the level of the signal light output from the amplification fiber is higher than the first output threshold.

4. The receiving device according to claim 1, wherein the controller stops supplying of the pumping light in a case that the level of the signal light output from the amplification fiber is higher than the first output threshold, or the driving parameter of the pumping light source is smaller than the first driving threshold.

5. The receiving device according to claim 1, wherein the controller stops supplying of the pumping light in a case that the level of the signal light output from the amplification fiber is higher than the first output threshold, and the level of the signal light input into the amplification fiber is lower than the first input threshold, or in a case that the driving parameter of the pumping light source is smaller than the first driving threshold.

6. The receiving device according to claim 2, wherein the controller performs the feedback control in a case that
the level of the signal light input into the amplification fiber is lower than a second input threshold which is lower than the first input threshold, or
the level of the signal light output from the amplification fiber is lower than a second output threshold which is lower than the first output threshold, or
the driving parameter of the pumping light source is greater than a second driving threshold which is greater than the first driving threshold;
and the controller stops the feedback control, in a case that
the level of the signal light input into the amplification fiber is higher than the second input threshold and lower than the first input threshold, or
the level of signal light output from the amplification fiber is higher than the second output threshold and lower than the first output threshold, or
the driving parameter of the pumping light source is greater than the first driving threshold and smaller than the second driving threshold.

7. The receiving device according to claim 3, wherein the controller performs the feedback control in a case that
the level of the signal light input into the amplification fiber is lower than a second input threshold which is lower than the first input threshold, and
the level of the signal light output from the amplification fiber is lower than a second output threshold which is lower than the first output threshold;
and the controller stops the feedback control, in a case that
the level of the signal light input into the amplification fiber is higher than the second input threshold and lower than the first input threshold, and
the level of signal light output from the amplification fiber is higher than the second output threshold and lower than the first output threshold.

8. The receiving device according to claim 4, wherein the controller performs the feedback control in a case that
the level of the signal light output from the amplification fiber is lower than a second output threshold which is lower than the first output threshold, and
the driving parameter of the pumping light source is greater than a second driving threshold which is greater than the first driving threshold;
and the controller stops the feedback control, in a case that
the level of the signal light output from the amplification fiber is higher than the second output threshold and lower than the first output threshold, or
the driving parameter of the pumping light source is greater than the first driving threshold and smaller than the second driving threshold.

9. The receiving device according to claim 5, wherein the controller performs the feedback control in a case that
the level of the signal light output from the amplification fiber is lower than a second output threshold which is lower than the first output threshold, and
the level of the signal light input into the amplification fiber is lower than a second input threshold which is lower than the first input threshold, and
the driving parameter of the pumping light source is greater than a second driving threshold which is greater than the first driving threshold;
and the controller stops the feedback control, in a case that
the level of the signal light output from the amplification fiber is higher than the second output threshold and lower than the first output threshold, and
the level of the signal light input into the amplification fiber is higher than the second input threshold and lower than the first input threshold, or
in a case that the driving parameter of the pumping light source is greater than the first driving threshold and smaller than the second driving threshold.

10. The receiving device according to claim 2, wherein each of the first input threshold, first output threshold, and first driving threshold is provided as to a wavelength, and the controller applies the first input threshold, the first output threshold, and the first driving threshold corresponding to the wavelength of the signal light.

11. The receiving device according to claim 6, wherein each of the first input threshold, second input threshold, first output threshold, second output threshold, first driving threshold, and second driving threshold is provided as to a wavelength, and the controller applies the first input threshold, the second input threshold, the first output threshold, the second output threshold, the first driving threshold, and the second driving threshold corresponding to the wavelength of the signal light.

12. A receiving method comprising:
monitoring of one or more of
a level of signal light input into an amplification fiber having properties to amplify signal light when pumping light is supplied to the amplification fiber and to attenuate signal light when the pumping light is not supplied to the amplification fiber, a level of signal light output from the amplification fiber, and a driving parameter of a pumping light source that supplies the pumping light to the amplification fiber;

controlling supplying of the pumping light from the pumping light source to the amplification fiber such that the amplification fiber amplifies the signal light when the pumping light is supplied in a case that the level of the signal light input into the amplification fiber is lower than a first input threshold, or the level of the signal light output from the amplification fiber is lower than a first output threshold, or a driving parameter of the pumping light source is greater than a first driving threshold;

controlling stopping of the pumping light from the pumping light source to the amplification fiber such that the amplification fiber attenuates the signal light when the pumping light is not supplied in a case that the level of the signal light input into the amplification fiber is higher than the first input threshold, or the level of the signal light output from the amplification fiber is higher than the first output threshold, or a driving parameter of the pumping light source is smaller than the first driving threshold.

13. The receiving method according to claim 12, further comprising:

performing the feedback control in a case that the level of the signal light input into the amplification fiber is lower than a second input threshold which is lower than the first input threshold, or the level of the signal light output from the amplification fiber is lower than a second output threshold which is lower than the first output threshold, or a driving parameter of the pumping light source is greater than a second driving threshold which is greater than the first driving threshold;

wherein the feed control is stopped in a case that the level of the signal light input into the amplification fiber is higher than the second input threshold and lower than the first input threshold, or the level of the signal light output from the amplification fiber is higher than the second output threshold and lower than the first output threshold, or a driving parameter of the pumping light source is greater than the first driving threshold and smaller than the second driving threshold.

* * * * *